United States Patent
Sato et al.

(10) Patent No.: US 6,738,223 B2
(45) Date of Patent: May 18, 2004

(54) THIN FILM MAGNETIC HEAD HAVING SIDE FACES OF THE GD DEFINING LAYER AND THE LOWER MAGNETIC POLE LAYER ALIGNED IN THE TRACK WIDTH DIMENSION

(75) Inventors: Kiyoshi Sato, Niigata-ken (JP); Toshinori Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 93 days.

(21) Appl. No.: 10/134,906

(22) Filed: Apr. 29, 2002

(65) Prior Publication Data

US 2002/0167759 A1 Nov. 14, 2002

(30) Foreign Application Priority Data

May 8, 2001 (JP) .......................... 2001-137142

(51) Int. Cl.⁷ .............................. G11B 5/31; G11B 5/23
(52) U.S. Cl. ....................................... 360/126; 360/119
(58) Field of Search ................................. 360/126, 317, 360/119

(56) References Cited

U.S. PATENT DOCUMENTS 6,104,576 A    8/2000  Santini
6,172,848 B1 *  1/2001  Santini ..................... 360/126
6,490,127 B1 * 12/2002  Sasaki ...................... 360/126
2003/0151852 A1 * 8/2003  Sasaki et al. .............. 360/126

FOREIGN PATENT DOCUMENTS

JP          2000/57522          2/2000

* cited by examiner

Primary Examiner—Craig A. Renner
(74) Attorney, Agent, or Firm—Brinks Hofer Gilson & Lione

(57) ABSTRACT

A thin-film magnetic head has a lower magnetic pole section including a front portion close to a face of the head opposing a recording medium. The front portion has side faces flush with side faces of an upper magnetic core layer formed above the lower magnetic pole section. The lower magnetic pole section does not protrude from the sides of the upper magnetic pole layer. A gap depth defining layer is formed above the lower magnetic core layer and under the upper magnetic pole layer below the upper core layer. Side faces of the gap depth defining layer and the lower magnetic pole section are flush with side faces of the upper magnetic pole layer and/or the upper core layer in the track width direction.

8 Claims, 26 Drawing Sheets

THIN FILM MAGNETIC HEAD HAVING SIDE FACES OF THE GD DEFINING LAYER AND THE LOWER MAGNETIC POLE LAYER ALIGNED IN THE TRACK WIDTH DIMENSION

BACKGROUND OF THE INVENTION

1. Field of the Invention

The present invention relates generally to thin-film magnetic write heads for use in, for example, floating thin-film magnetic heads. Particularly, the present invention relates to a thin-film magnetic head having a small gap depth (Gd), which is free from side writing.

2. Description of the Related Art

FIG. 28 is a longitudinal sectional view of a conventional thin-film magnetic write head. As shown in FIG. 28, the conventional thin-film magnetic write head comprises a lower core layer 10 made of a magnetic material such as a NiFe alloy and a gap layer 11 made of $Al_2O_3$ or $SiO_2$ formed on the lower core layer 10.

Referring to FIG. 28, a gap depth (Gd) defining layer 12 is formed at a position on the gap layer 11 a predetermined distance L1 behind in the height direction, i.e., the Y direction in the drawing, relative to the face opposing a recording medium. The Gd defining layer 12 is composed of an organic insulative material such as resist, for example. The predetermined distance L1 is the gap depth (Gd).

Referring to FIG. 28, an upper magnetic pole layer 13 made by plating using a magnetic material such as a NiFe alloy extends from the face opposing the recording medium to the top of the Gd defining layer 12 while overlaying the gap layer 11 and the Gd defining layer 12 with a plating base layer 13a therebetween. An insulating layer 14 composed of $Al_2O_3$ or the like is formed behind the upper magnetic pole layer 13 in the height direction.

A coil layer (not shown) is formed on the insulating layer 14, and an insulating layer 18 composed of an organic insulative material or the like is formed on the insulating layer 14 so as to cover the coil layer.

Referring to FIG. 28, an upper core 15 is plated over the upper magnetic pole layer 13, the insulating layer 14, and the insulating layer 18 using a magnetic material such as a NiFe alloy.

FIG. 29 is a perspective view showing the structure of the vicinity of the face of the thin-film magnetic head opposing the recording medium shown in FIG. 28. The drawing of FIG. 29 is a schematic illustration and the upper core 15, for example, is omitted from the drawing.

As shown in FIG. 29, the lower core layer 10 at the two sides of the upper magnetic pole layer 13 in the track width direction, i.e., the X direction in the drawing, is milled to form recesses 16.

Referring to FIG. 29, a lower magnetic pole section 10a protruding from the upper surface of the lower core layer 10 is formed under the Gd defining layer 12. The lower magnetic pole section 10a is also under the upper magnetic pole layer 13. The width of the lower magnetic pole section 10a in the track width direction at a position below the upper magnetic pole layer 13 is the same as the track width Tw and is substantially the same as the width of the upper magnetic pole layer 13.

In this conventional head, a recording magnetic field is mainly generated between the upper magnetic pole layer 13 and the lower magnetic pole section 10a and leaks from the face of the head opposing the recording medium. Since the lower magnetic pole section 10a protrudes from the surface of the lower core layer 10 toward the upper magnetic pole layer 13, top faces 10b of the lower core layer 10 are distant from the upper magnetic pole layer 13. This distance promotes generation of a recording magnetic field between the upper magnetic pole layer 13 and the lower magnetic pole section 10a, both having the track width Tw, thereby suitably inhibiting the occurrence of side fringing.

Trends toward higher recording densities demand narrower tracks and smaller gap depths. In order to prevent magnetic saturation, decrease in recording current is also necessary. Since a combination of a large gap depth (Gd) and decreased recording current causes drastic reduction in magnetic flux generated between the upper magnetic pole layer 13 and the lower magnetic pole section 10a, the gap depth (Gd) is preferably small.

In view of the above, conventionally, the Gd defining layer 12 is arranged near the face opposing the recording medium so as to shorten the gap depth L1, as shown in FIG. 29. The gap depth L1 is, for example, 0.6 μm or less.

However, the thin-film magnetic head shown in FIG. 29, which has a decreased gap depth L1, suffers from the following problems.

Referring to FIG. 29, the Gd defining layer 12 protrudes from the two sides of the upper magnetic pole layer 13 in the track width direction, i.e., the X direction in the drawing. The protruding Gd defining layer 12 functions as a mask for forming the recesses 16 by milling the lower core layer 10 with ions and allows the portion of the lower core layer 10 under the Gd defining layer 12 to remain intact during milling with ions. Thus, similarly to the Gd defining layer 12, the resulting lower magnetic pole section 10a protrudes from the two sides of the upper magnetic pole layer 13 in the track width direction. The portion of the lower core layer 10 protruding from a side of the upper magnetic pole layer 13 is referred to as a protuberance 10a1. The distance between the face opposing the recording medium and the protuberance 10a1 is substantially the same as the gap depth, which is represented by L1.

Since the protuberance 10a1 under the Gd defining layer 12 protrudes from the upper magnetic pole layer 13 in the track width direction, the protuberance 10a1 has a large cross-section taken in the direction parallel to the face opposing the recording medium. As a result, the demagnetizing field is strong at the protuberance 10a1.

At a large gap depth L1, the demagnetizing field of the protuberance 10a1 hardly causes any problem because the protuberance 10a1 is distant from the face opposing the recording medium in the height direction, i.e., the Y direction in the drawing. However, at a small gap depth L1, the distance between the protuberance 10a1 and the face opposing the recording medium is decreased, resulting in generation of a leakage magnetic field between the upper magnetic pole layer 13 and the protuberance 10a1.

Since the width of the protuberance 10a1 in the track width direction is larger than the track width Tw, the protuberance 10a1 also writes data and thus cause side writing.

FIG. 30 is a graph showing a track profile, i.e., an output profile in the cross-track direction, taken by actually reading data written on a recording medium using a magnetoresistive (MR) head comprising the thin-film magnetic head shown in FIG. 29. In this experiment, data was recorded using the thin-film magnetic head having a skew angle, i.e., an inclination with respect to the tangential direction of the motion of the recording medium, and was read using the MR head.

As shown in FIG. 30, the read waveform has a peak A and a noise waveform B at a side of the peak A. The noise waveform B demonstrates that the upper magnetic pole layer 13 and the protuberance 10a1 caused side writing.

Side writing causes degradation, such as the generation of noise, in recording characteristics. In other words, as shown in FIG. 29, the conventional thin-film magnetic head comprising the Gd defining layer 12 and the lower magnetic pole section 10a formed by milling the surface of the lower core layer 10 cannot achieve both small gap depth and inhibition of side writing.

SUMMARY OF THE INVENTION

The present invention aims to solve the above-described problems of the conventional art. An object of the present invention is to provide a thin-film magnetic head having a narrower track width required for higher recording densities while suitably preventing side writing. Another object of the present invention is to provide a manufacturing method for such a thin-film magnetic head.

The present invention provides a thin-film magnetic head comprising: a lower core layer comprising a lower magnetic pole section which extends in a height direction from an opposing face of the thin-film magnetic head opposing a recording medium and protrudes from an upper surface of the lower core layer; a gap layer formed on the lower core layer; an upper magnetic pole layer formed on the gap layer, the upper magnetic pole layer having a width smaller than that of the lower core layer; an upper core layer formed on the upper magnetic pole layer and above the gap layer; and a gap depth defining layer formed above the lower magnetic core layer and under the upper magnetic pole layer below the upper core layer, the gap depth defining layer being disposed a predetermined distance behind the opposing face. Two side faces of the gap depth defining layer and two side faces of the lower magnetic pole section in a track width direction are flush with two side faces of the upper magnetic pole layer and the two side faces of the upper core layer in the track width direction at at least a front portion of the layers that is close to the opposing face.

In a conventional magnetic head, the lower magnetic pole section protrudes in the track width direction from the two sides of the upper magnetic pole layer. In the present invention, at at least the front portion close to the opposing face, the lower magnetic pole section does not protrude from the sides of the gap depth defining layer, and the two side faces of the lower magnetic pole section and the two side faces of the gap depth defining layer are flush with the two side faces of the upper core layer.

As a result, in the present invention, side writing can be suitably prevented even at a small gap depth defined by the distance from the front end of the gap depth defining layer to the opposing face because of the above structure. Thus, a thin-film magnetic head free of side writing and having superior recording characteristics can be provided.

In the present invention, the length of the lower magnetic pole section at the front portion is preferably at least 0.6 μm in order to suitably prevent side writing.

In the present invention, the gap layer may be formed on the lower magnetic pole section, and the gap depth defining layer preferably comprises an insulative material comprising at least one selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

In the present invention, the gap depth defining layer may be formed on the lower magnetic pole section, and the gap layer may extend over the lower magnetic pole section and the gap depth defining layer. In such a case, the gap layer preferably comprises a nonmagnetic metal material comprising at least one selected from the group consisting of NiP, NiPd, NiW, NiMo, NiCu, Au, Pt, Rh, Pd, Ru, and Cr.

Preferably, the gap depth defining layer has a substantially semi-elliptic vertical cross-section taken in the height direction and in a direction perpendicular to a bottom face of the lower core layer.

The gap depth defining layer may protrude in the height direction from a back end face of the upper magnetic pole layer, and the protruding portion of the gap depth defining layer may have a flat or curved face tilting in the height direction as the face extends from the upper magnetic pole layer to the lower magnetic pole section.

The thin-film magnetic head of the present invention may further comprise a coil layer formed on the lower core layer with an insulating layer therebetween, the coil layer being formed behind the lower magnetic core layer in the height direction. The coil layer may be covered with the gap depth defining layer, and a front portion of the gap depth defining layer lying in front of the coil layer may have two side faces that are flush with the two side faces of the upper magnetic core layer.

A method for manufacturing the thin-film magnetic head of the present invention comprises the steps of:

(a) forming the gap layer on the lower core layer and forming the gap depth defining layer on the gap layer at a position distant from the opposing face in the height direction;

(b) forming a resist layer on the lower core layer and the gap depth defining layer, and exposing and developing the resist layer to form an opening, the opening having a width smaller than that of the gap depth defining layer in the track width direction and extending from the opposing face to the top of the gap depth defining layer;

(c) forming the upper magnetic pole layer in the opening by plating and removing the resist layer;

(d) removing at least a front portion close to the opposing face of the gap depth defining layer protruding from the two sides of the upper magnetic pole layer in the track width direction and making the two side faces of the resulting gap depth defining layer flush with the two side faces of the upper magnetic pole layer;

(e) removing the gap layer extending at the two sides of the upper magnetic pole layer in the track width direction and milling the surface of the lower core layer exposed by removing the gap layer so as to form the lower magnetic pole section protruding from the upper surface of the lower core layer so as to make the two side faces of a portion of the lower magnetic pole section flush with the two side faces of the upper magnetic pole section and the two side faces of the gap depth defining layer, the portion of the lower magnetic pole section being under the gap depth defining layer having the two side faces flush with the two side faces of the upper magnetic pole layer as a result of step (d); and (f) forming the upper core layer on the upper magnetic pole layer.

According to this method, the side faces of the gap depth defining layer and the lower magnetic pole section formed under the upper magnetic pole layer can be made flush with the side faces of the upper magnetic pole layer at least at a front portion close to the opposing face.

As a result, a thin-film magnetic head having a small gap depth for higher recording densities and suitably preventing side writing can be manufactured by the above method.

Preferably, the method further comprises step (g) of forming a plating base layer on the lower core layer and gap depth defining layer between step (a) and step (b), and before step (d), the plating base layer formed around the upper magnetic pole layer is removed so as to expose the gap depth defining layer and the gap layer. With such steps, the upper magnetic pole layer can be easily and properly formed by plating.

In the present invention, the gap layer preferably comprises an insulative material comprising at least one selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Another method for manufacturing the thin-film magnetic head of the present invention comprises the steps of:

(h) forming the gap depth defining layer on the lower core layer and behind the opposing face in the height direction;

(i) forming a resist layer on the lower magnetic core layer and the gap depth defining layer and exposing and developing the resist layer so as to form an opening, the opening having a width smaller than the width of the gap depth defining layer in the track width direction and extending from the opposing face up to the top of the gap depth defining layer;

(j) forming the gap layer and the upper magnetic pole layer in the opening by plating and removing the resist layer;

(k) removing at least a front portion of the gap depth defining layer protruding form the two sides of the upper magnetic pole layer in the track width direction and being close to the opposing face so as to make the two side faces of the gap depth defining layer flush with the two side faces of the upper magnetic pole layer;

(l) milling the surface of the lower core layer extending at two sides of the upper magnetic pole layer in the track width direction so as to form the lower magnetic pole section protruding from the top face of the lower core layer, thereby making the two side faces of a portion of the lower magnetic pole section flush with the side faces of the upper magnetic pole layer and the gap depth defining layer, the portion of the lower magnetic pole section being under the gap depth defining layer flush with the side faces of the upper magnetic pole layer through step (k); and (m) forming the upper core layer on the upper magnetic pole layer.

According to this method also, the side faces of the gap depth defining layer and the lower magnetic pole section formed under the upper magnetic pole layer can be made flush with the side faces of the upper magnetic pole layer at least at a front portion close to the opposing face. As a result, a thin-film magnetic head having a small gap depth for higher recording densities and suitably preventing side writing can be manufactured by the above method.

The gap layer is preferably formed by plating with a nonmagnetic metal material selected from the group consisting of NiP, NiPd, NiW, NiMo, NiCu, Au, Pt, Rh, Pd, Ru, and Cr. With this material, the gap layer and the upper magnetic pole layer can be sequentially plated.

Preferably, in steps (d) and (k), the portions of the gap depth defining layer protruding from the upper magnetic pole layer are removed by RIE or ashing. During these steps, the upper magnetic pole layer may function as a mask so as to selectively remove the protruding portions of the gap depth defining layer by RIE or ashing.

Preferably, in steps (e) and (l), the surface of the lower core layer is milled with ions to form the lower magnetic pole section.

DESCRIPTION OF THE PREFERRED EMBODIMENTS

Figure 1:
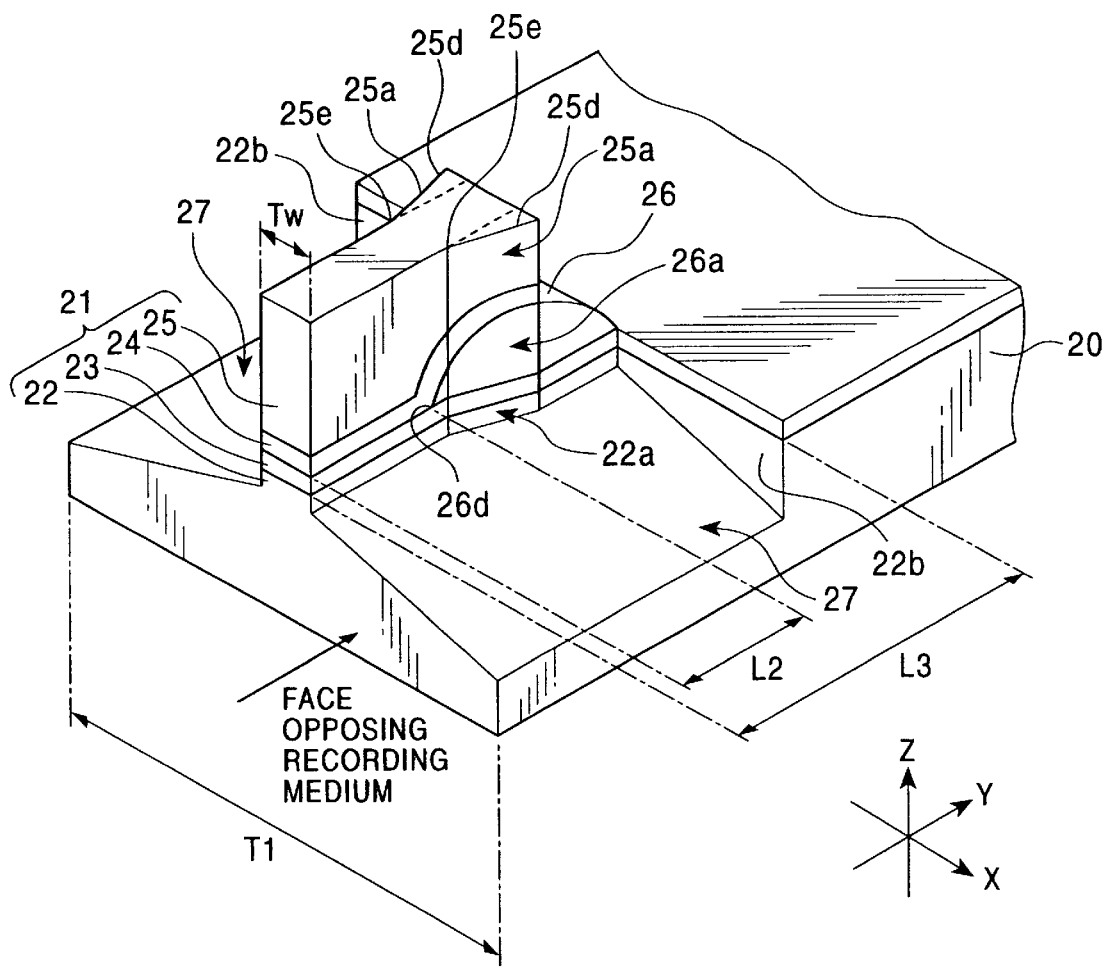
FIG. 1 is a partial perspective view of a thin-film magnetic head according to a first embodiment of the present invention.
Figure 2:
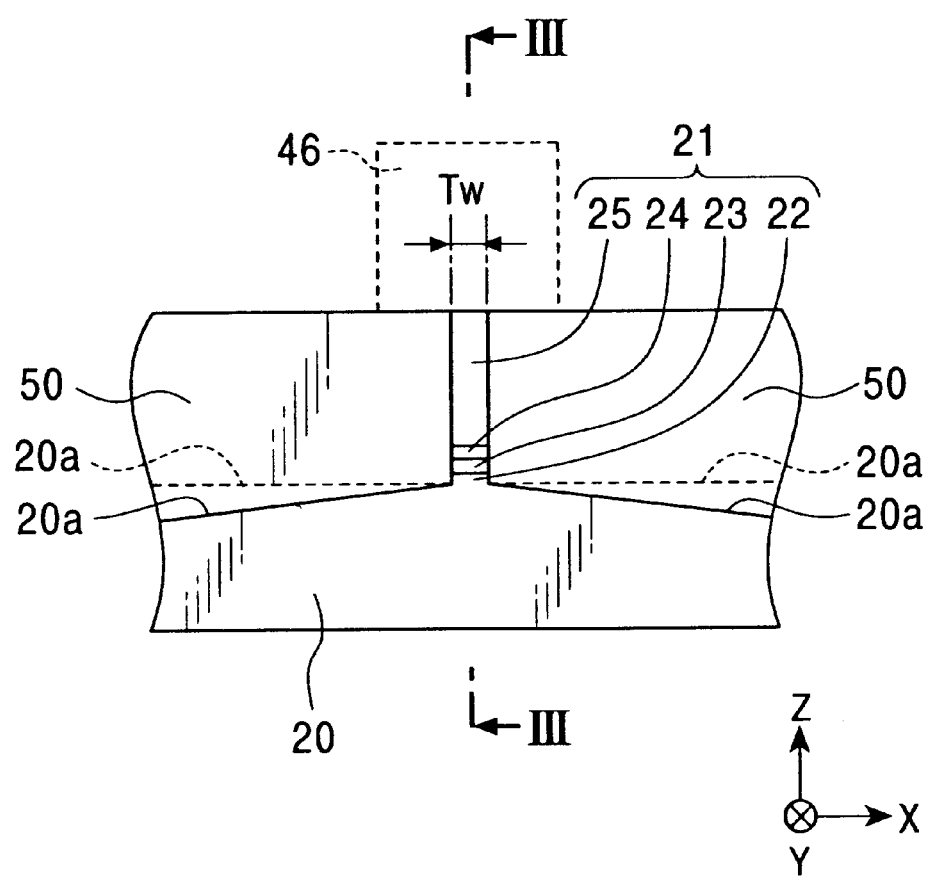
FIG. 2 is a partial front view of the thin-film magnetic head shown in FIG. 1.
Figure 3:
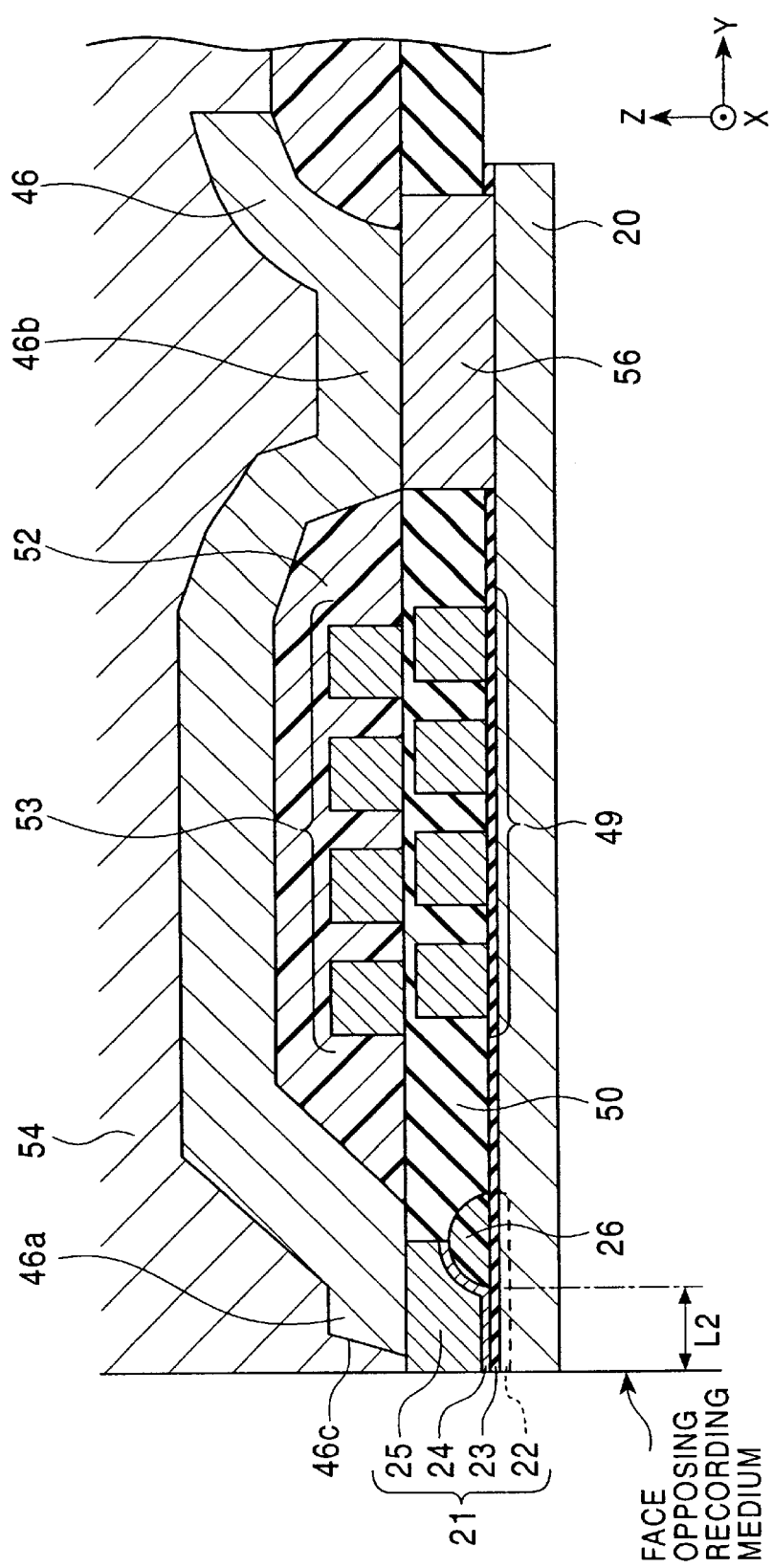
FIG. 3 is a partial vertical cross-sectional view of the thin-film magnetic head taken along line III—III in FIG. 2.

FIG. 1 is a partial perspective view schematically illustrating the structure of a thin-film magnetic head according to a first embodiment the present invention. FIG. 2 is a partial front view of the thin-film magnetic head shown in FIG. 1. FIG. 3 is a partial cross-section viewed in the direction of the arrow, the cross-section taken along line III—III in FIG. 2.

The thin-film magnetic head shown in FIGS. 1 to 3 is an inductive write head. Alternatively, in the present invention, the thin-film magnetic head may comprise a magnetoresistive (MR) read head utilizing a magnetoresistive effect deposited under this inductive write head.

The thin-film magnetic head shown in FIGS. 1 to 3 comprises a lower core layer 20 composed of a magnetic material such as permalloy. In case of forming a read head under the lower core layer 20, a shield layer for protecting a MR element from noise may be formed in addition to the lower core layer 20, or the lower core layer 20 may also function as an upper shield layer of the read head without providing an additional layer.

As shown in FIGS. 1 to 3, a magnetic pole unit 21 is formed on the lower core layer 20. The magnetic pole unit 21 is exposed at the face opposing the recording medium. In this embodiment, the magnetic pole unit 21 regulates the track width and thus has a track width Tw. The track width Tw is preferably 0.7 $\mu$m or less, and more preferably, 0.5 $\mu$m or less.

In the embodiment shown in FIGS. 1 to 3, the magnetic pole unit 21 is a composite comprising a lower magnetic pole section 22, a gap layer 23, a plating base layer 24, and an upper magnetic pole layer 25, deposited in that order.

As shown in FIGS. 1 to 3, the lower magnetic pole section 22 is integral with the lower core layer 20 and protrudes from the surface of the lower core layer 20 toward the upper magnetic pole layer 25. The lower magnetic pole section 22 also extends in the height direction (the Y direction in the drawing) from the face opposing the recording medium to the back end of a Gd defining layer 26 while being overlaid by the Gd defining layer 26.

The lower core layer 20 has a width T1 at the face opposing the recording medium (hereinafter, the opposing face) in the track width direction, i.e., the X direction in the drawing. The width of the lower magnetic pole section 22 at the same face is smaller than T1. The width of the lower magnetic pole section 22 is substantially the same as the width of the upper magnetic pole layer 25 at the opposing face which is equal to the track width Tw. The height of the lower magnetic pole section 22 is, for example, approximately 0.2 to 0.5 $\mu$m.

The gap layer 23 on the lower magnetic pole section 22 is preferably composed of an insulative material comprising at least one of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The gap layer 23 preferably has a thickness of, for example, 0.08 to 0.15 $\mu$m.

As shown in FIG. 1, the Gd defining layer 26 is formed on the gap layer 23. The Gd defining layer 26 is distant from the opposing face in the height direction (the Y direction in the drawing) by a predetermined length L2. The length L2 is the gap depth. By suitably controlling the gap depth, various characteristics of the thin-film magnetic head such as overwrite characteristics or the like can be improved.

As shown in FIG. 1, the plating base layer 24 overlays the gap layer 23 and the Gd defining layer 26. The plating base layer 24 may be formed of a magnetic material such as NiFe, CoFe, or the like. Alternatively, it may be formed of a nonmagnetic metal material such as Cu, Au, Pd. Rh, Ru, Pt, NiLu, NiP, NiPd, NiW, NiB, NiMo, Ir, etc. The plating base layer 24 is formed by sputtering or the like and has a small thickness, for example, 5 to 80 nm.

As shown in FIG. 1, the upper magnetic pole layer 25 is formed on the plating base layer 24. The upper magnetic pole layer 25 may be formed of a material different from or the same as that of an upper core layer 46 described below. However, the upper magnetic pole layer 25 is preferably formed of a magnetic material having a higher saturation magnetic flux density than the upper core layer 46. With such a material, a recording magnetic field can be suitably introduced from the upper core layer 46 to the upper magnetic pole layer 25, and the recording magnetic field generated between the upper magnetic pole layer 25 and the lower magnetic pole section 22 can be increased. The upper magnetic pole layer 25 may be a single layer or a composite of layers. The height of the upper magnetic pole layer 25 is, for example, approximately 2.0 to 3.0 $\mu$m.

In this embodiment, as shown in FIG. 1, the surface of the lower core layer 20 at the two sides of the upper magnetic pole layer 25 extending in the height direction (the Y direction in the drawing) from the opposing face is milled to form recesses 27. Milling the surface of the lower core layer 20 at the two sides of the upper magnetic pole layer 25 forms the lower magnetic pole section 22 protruding from the surface of the lower core layer 20 under the upper magnetic pole layer 25.

Figure 29:
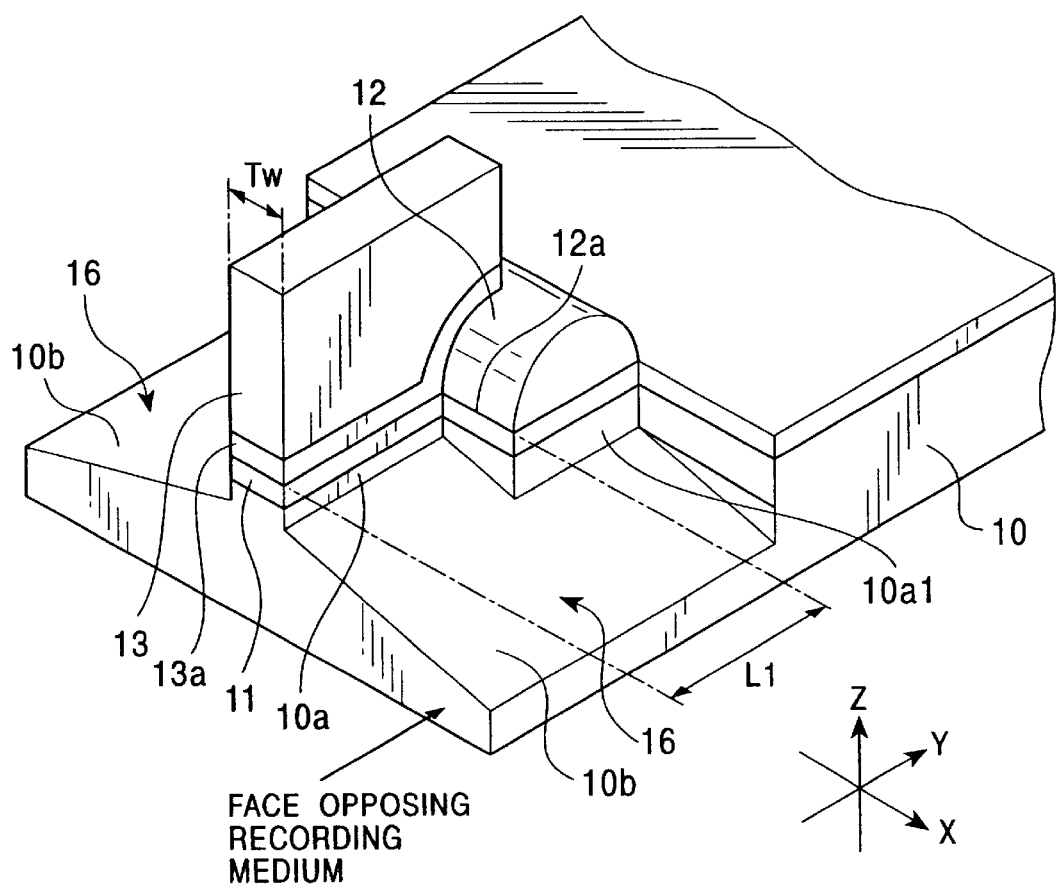
FIG. 29 is a partial perspective view of the conventional thin-film magnetic head.

In this embodiment, unlike the conventional magnetic head shown in FIG. 29, the Gd defining layer 26 does not protrude in the track width direction (the X direction in the drawing) from the two sides of the upper magnetic pole layer 25. Two side faces 25a of the upper magnetic pole layer 25 in the track width direction are flush with two side faces 26a of the Gd defining layer 26 in the track width direction.

Moreover, the lower magnetic pole section 22 does not protrude from the two sides of the upper magnetic pole layer 25 in the track width direction (the X direction in the drawing). Two side faces 22a of the lower magnetic pole section 22 in the track width direction are flush with the two side faces 25a of the upper magnetic pole layer 25 and the two side faces 26a of the Gd defining layer 26.

Accordingly, the gap depth (Gd) defined by the length L2 from the opposing face to a front end 26d of the Gd defining layer 26 can be decreased to improve various characteristics such as overwrite characteristics and to secure the required amount of magnetic flux between the magnetic pole layers so as to meet the demand for smaller recording current. Even at a decreased gap length, side writing can be suitably prevented since the lower magnetic pole section 22 does not protrude in the track width direction (the X direction) from the two sides of the upper magnetic pole layer 25. Thus, a thin-film magnetic head having a small gap depth and superior recording characteristics can be manufactured to meet the demand for higher recording density, while preventing side writing.

In this embodiment, although the lower magnetic pole section 22 does not protrude in the track width direction from the two sides of the upper magnetic pole layer 25, recess forming faces 22b extending in the track width direction from the two sides of the upper magnetic pole layer 25 are formed at the back end of recesses 27 as a result of milling of the lower core layer 20 at the two sides of the upper magnetic pole layer 25.

If the recess forming faces 22b are formed near the opposing face, a demagnetizing field from the recess forming faces 22b causes side writing. The recess forming faces 22b must be sufficiently distant from the opposing face in the height direction (the Y direction in the drawing).

In this embodiment, a length L3 from the opposing face up to the recess forming faces 22b, in other words, the length L3 of the portion of the lower magnetic pole section 22, the side faces thereof being flush with the side faces 25a of the upper magnetic pole layer 25, from the opposing face in the height direction, is preferably 0.6 μm or more. At a length L3 of less than 0.6 μm, side writing may readily occur.

As shown in FIG. 1, sloped (curved) faces 25d having a width gradually increasing as they extend in the height direction from inflection points 25e are provided at the back end of the upper magnetic pole layer 25. With the sloped faces 25d, the area of the top of the back end of the upper magnetic pole layer 25 can be increased, and so can the contact area between the upper magnetic pole layer 25 and the upper core layer 46 formed thereon. As a result, the introduction of the magnetic flux from the upper core layer 46 to the upper magnetic pole layer 25 can be promoted, and the leakage magnetic flux of the upper magnetic pole layer 25 from the opposing face can be increased.

The inflection points 25e must be arranged behind front ends 26d of the Gd defining layer 26 in the height direction. Otherwise, the gradually broadening back portion of the upper magnetic pole layer 25 is placed in front of the Gd defining layer 26, thereby causing side writing as in the conventional art.

The back end of the upper magnetic pole layer 25 need not have increasing width shown in FIG. 1. As shown by dotted lines in FIG. 1, the back end of the upper magnetic pole layer 25 may be substantially rectangular.

Figure 4:
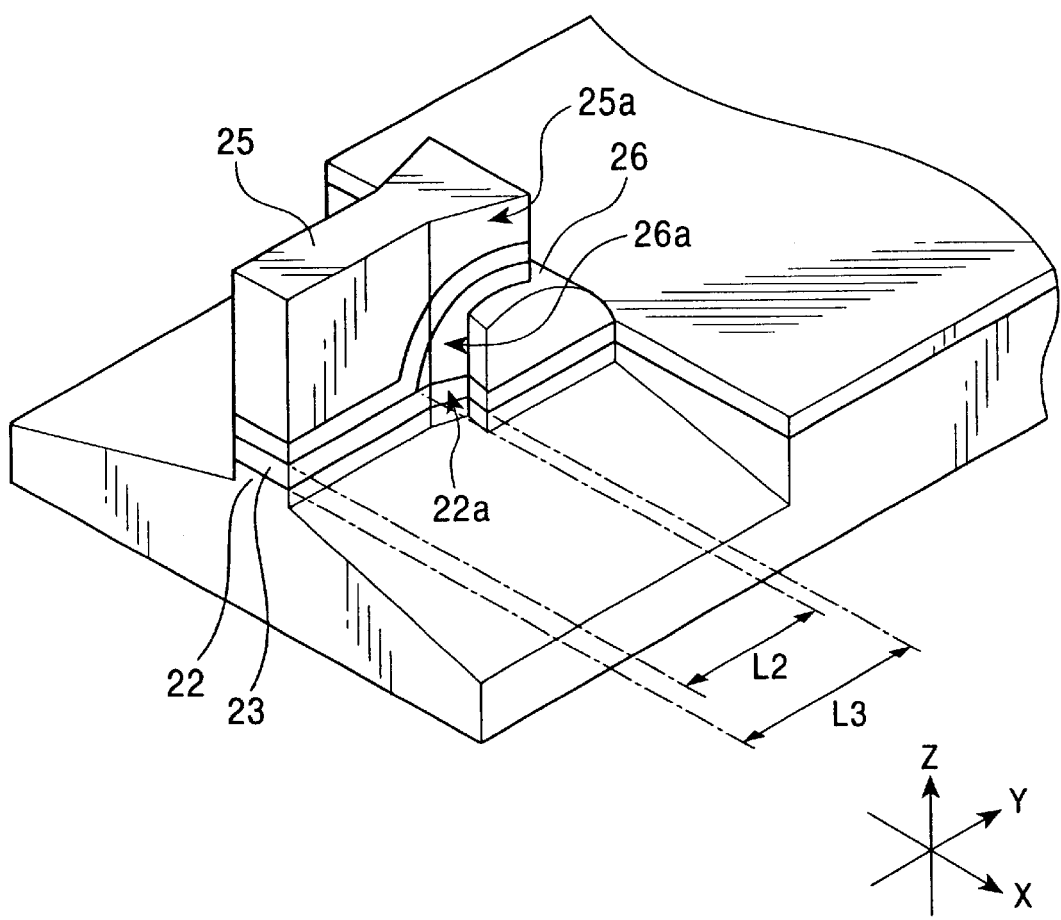
FIG. 4 is a partial perspective view of a thin-film magnetic head according to a second embodiment of the present invention.

Other embodiments of the present invention are now described. FIG. 4 is a partial perspective view illustrating a thin-film magnetic head according to a second embodiment of the present invention. Some components, such as an upper core layer, are omitted from the drawing.

In this embodiment, front portions of the two side faces 26a of the Gd defining layer 26 in the track width direction (the X direction in the drawing) are partially flush with the two side faces 25a of the upper magnetic pole layer 25.

The lower magnetic pole section 22 is formed under the Gd defining layer 26. The two side faces 22a of the lower magnetic pole section 22 in the track width direction (the X direction in the drawing) are flush with the two side faces 25a of the upper magnetic pole layer 25 and the above-described portions of the two side faces 26a of the Gd defining layer 26.

In this embodiment, the lower magnetic pole section 22 protrudes from the two side faces 25a of the upper magnetic pole layer 25 in the track width direction (the X direction in the drawing). However, at the portion of the lower magnetic core layer 22 closer to the opposing face, the two side faces 22a are flush with the two side faces 25a of the upper magnetic pole layer 25. Thus, even at a small gap depth L2, the distance from the opposing face to the protruding portion of the lower magnetic core layer 22 is larger compared to the conventional art.

Accordingly, the thin-film magnetic head of the second embodiment shown in FIG. 4 has a small gap depth, which meets the demand for higher recording density, and suitably prevents side writing.

In this embodiment, the length L3, i.e., the distance in the height direction (the Y direction in the drawing) from the opposing face up to the portion of the lower magnetic pole section 22 protruding from the side face of the upper magnetic pole layer 25, is preferably 0.6 μm or more. At this length, side writing can be suitably prevented.

Figure 5:
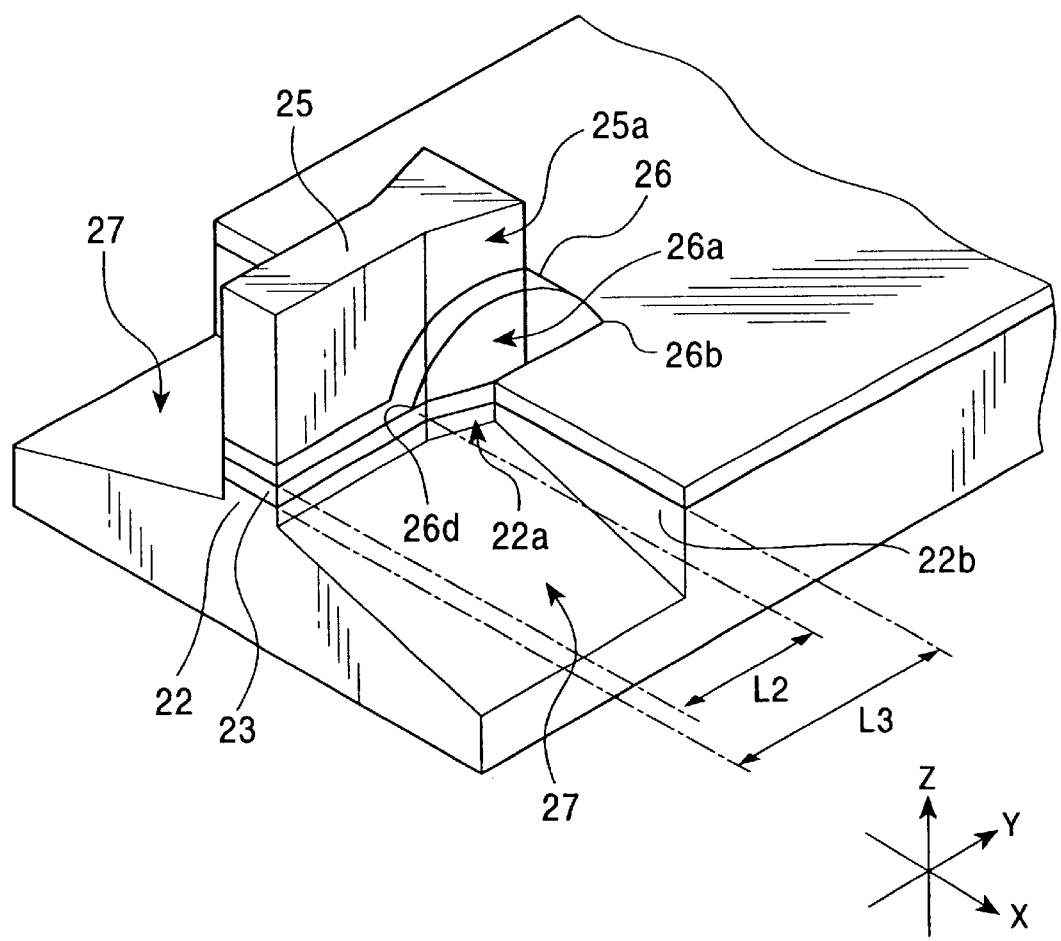
FIG. 5 is a partial perspective view of a thin-film magnetic head according to a third embodiment of the present invention.

FIG. 5 is a partial perspective view illustrating a thin-film magnetic head according to a third embodiment of the present invention.

In FIG. 5, the Gd defining layer 26 does not protrude from the two side faces 25a of the upper magnetic pole layer 25 in the track width direction (the X direction in the drawing). The two side faces 26a of the Gd defining layer 26 are flush with the two side faces 25a of the upper magnetic pole layer 25.

This embodiment differs from the first and second embodiments in that the recesses 27 formed by milling the surface of the lower core layer 20 at the two sides of the upper magnetic pole layer 25 in the track width direction have back ends, i.e., the recess forming faces 22b, located closer to the opposing face to the recording medium than are back ends 26b of the Gd defining layer 26. The recess forming faces 22b must at least be behind the front ends 26d of the Gd defining layer 26 in the height direction (the Y direction in the drawing).

As shown in FIG. 5, the two side faces 22a of the lower pole section 22, which are defined by forming the recesses 27, are flush with the two side faces 25a of the upper magnetic pole layer 25.

Since the lower magnetic pole section 22 has two side faces 22a that are flush with the two side faces 25a of the upper magnetic pole layer 25 and does not protrude from the two sides of the upper magnetic pole layer 25, side writing can be suitably prevented even at a small gap depth regulated by the length L3 from the front end 26d of the Gd defining layer 26 up to the opposing face.

The length L3 of the portion of the lower magnetic pole section 22 flush with the side faces 25a of the upper magnetic pole layer 25, i.e., the distance in the height direction from the opposing face up to the recess forming faces 22b, is preferably 0.6 µm or more so as to suitably prevent side writing.

Figure 6:
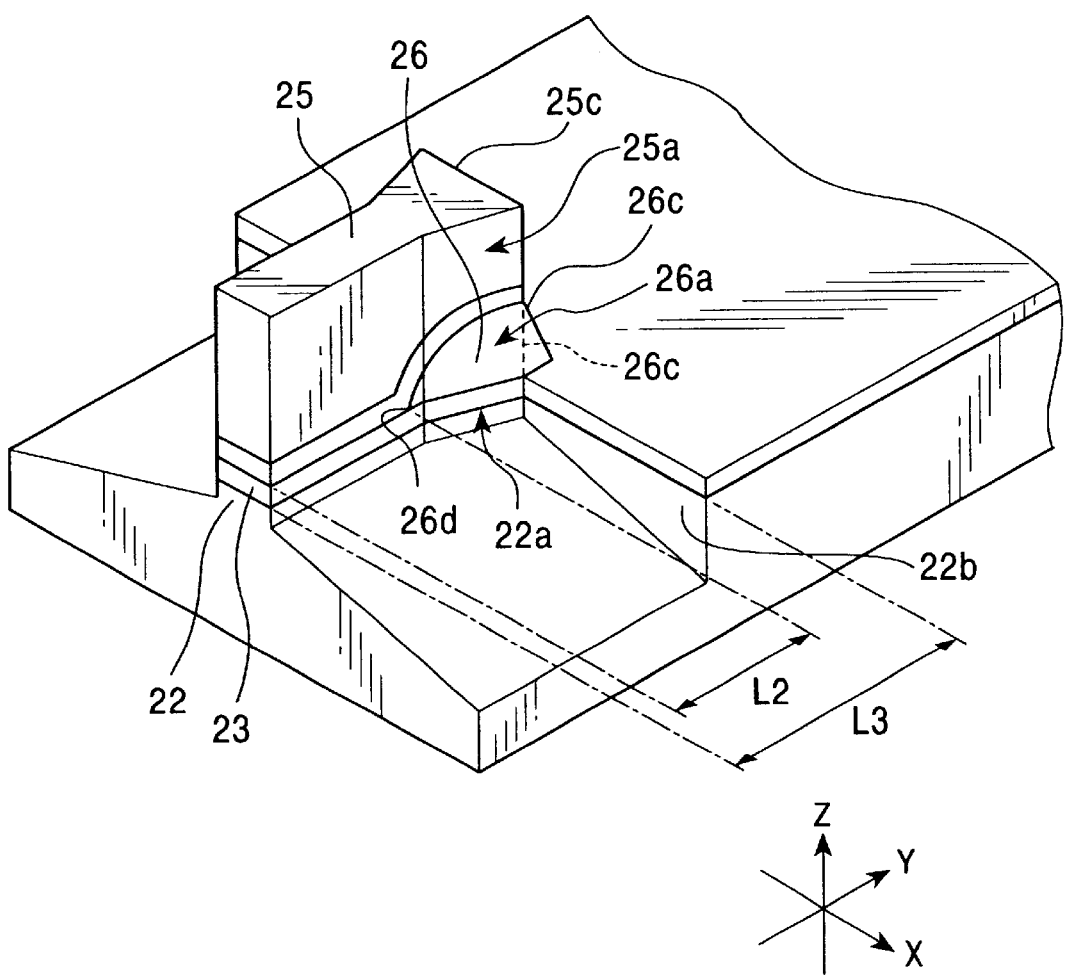
FIG. 6 is a partial perspective view of a thin-film magnetic head according to a fourth embodiment of the present invention.

FIG. 6 is a partial perspective view illustrating a thin-film magnetic head according to a fourth embodiment of the present invention.

This embodiment differs from the first to third embodiments shown in FIGS. 1, 4, and 5 in the vertical cross-section of the Gd defining layer 26 taken along the plane defined by the Z direction and Y direction in the drawing.

In this embodiment, a back face 26c of the Gd defining layer 26 tilts in the height direction (the Y direction in the drawing) toward the lower magnetic pole section 22. The back face 26c may be flat or curved. Alternatively, the back face 26c may be flush with a back face 25c of the upper magnetic pole layer 25, as shown by a dotted line in FIG. 6.

In this embodiment also, the two side faces 26a of the Gd defining layer 26 and the two side faces 22a of the lower magnetic pole section 22, both formed under the upper magnetic pole layer 25 are flush with the two side faces 25a of the upper magnetic pole layer 25.

Since the lower magnetic pole section 22 does not protrude from the two side faces 25a of the upper magnetic pole layer 25 in the track width direction (the X direction in the drawing), side writing can be suitably prevented even at a small gap depth regulated by the length L2 for higher recording density. The length L2 is a distance between the front end 26d of the Gd defining layer 26 to the opposing face.

In this embodiment, the length L3 of the portion of the lower magnetic pole section 22 flush with the side face of the upper magnetic pole layer 25, the distance in the height direction from the opposing face to the recess forming face 22b is preferably 0.6 µm or more so as to suitably prevent side writing.

The material of the Gd defining layer 26 will now be described.

In the present invention, the Gd defining layer 26 is preferably composed of an organic material such as a resist material so as to form a Gd defining layer 26 of a desired shape.

In this invention, the Gd defining layer 26 may be composed of, for example, a resist material comprising a UV curable resin. In this case, the resist material is applied, heated to allow the surface of the applied resist material to sag, and is cured by UV irradiation.

Alternatively, the Gd defining layer 26 may be composed of an inorganic material. Examples of inorganic materials are $SiO_2$ and $Al_2O_3$. Alternatively, the Gd defining layer 26 may be composed of a nonmagnetic metal material such as copper (Cu).

The structures of the components other than the magnetic pole unit 21 and the Gd defining layer 26 will now be described with reference to FIGS. 2 and 3.

Referring to FIG. 2, top faces 20a of the lower core layer 20 extending from the bottom end of the lower magnetic pole section 22 in the track width direction (the X direction in the drawing) decline so as to be distant from the upper magnetic pole layer 25. The surface of each top face 20a may be flat or curved. With this structure, side fringing can be suitably prevented. Alternatively, the top faces 20a may be flat and parallel to the bottom face of the lower core layer 20, as shown by dotted lines.

As shown in FIGS. 2 and 3, a first coil layer 49 is disposed behind the magnetic pole unit 21 in the height direction (the Y direction in the drawing). The first coil layer 49 is wound into a spiral and is formed on the lower core layer 20 with the gap layer 23 therebetween. The first coil layer 49 may be formed on an insulating base layer (not shown) formed on the gap layer 23. The insulating base layer is preferably composed of an insulative material comprising at least one selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON, for example.

The pitch between turns of the spiral of the first coil layer 49 is preferably filled with an insulating layer 50. The insulating layer 50 preferably comprises at least one material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIG. 2, the insulating layer 50 is formed at the two sides of the magnetic pole unit 21 in the track width direction (the X direction in the drawing) and is exposed at the face opposing the recording medium.

As shown in FIG. 3, a second coil layer 53 wound into a spiral is formed on the insulating layer 50.

As shown in FIG. 3, the second coil layer 53 is covered with an insulating layer 52 composed of an organic material such as resist or polyimides. An upper core layer 46 composed of a NiFe alloy or the like is patterned on the insulating layer 52 by, for example, frame plating.

As shown in FIG. 3, a front end portion 46a of the upper core layer 46 is formed on the upper gap layer 43 and is magnetically connected to the upper gap layer 43. A rear anchor 46b of the upper core layer 46 is magnetically connected to a planarizing layer 56 which is composed of a magnetic material such as a NiFe alloy and disposed on the lower core layer 20. The planarizing layer 56 need not be formed; in such a case, the rear anchor 46b of the upper core layer 46 is directly connected to the lower core layer 20.

Although the thin-film magnetic head shown in FIG. 3 comprises two coil layers, the number of coil layers may be more than two or may be one. When only one coil layer is used, the region on the lower core layer 20 behind the magnetic pole unit 21 is filled with the insulating layer 50, and the coil layer is formed on the insulating layer 50. Alternatively, the second coil layer 53 shown in FIG. 1 may be omitted and the upper core layer 46 may be directly formed on the insulating layer 50. When two or more coil layers are deposited, the distance between the opposing face and the planarizing layer 56 can be decreased so as to shorten the magnetic path and decrease inductance. Thus, the recording characteristics at radio frequencies can be improved.

Moreover, as shown in FIG. 3, a front end face 46c of the upper core layer 46 is not exposed at the opposing face but is formed behind the opposing face in the height direction (the Y direction in the drawing). With this structure, side fringing can be suitably decreased, and a thin-film magnetic head capable of meeting needs of higher recording density can be manufactured.

Alternatively, the front end face 46c of the upper core layer 46 may be exposed at the opposing face.

As shown FIG. 3, the front end face 46c may be tilted in the Y direction as the front end face 46c extends in the Z direction in the drawing from the lower core layer 20. The front end face 46c may be flat or curved. If the front end face 46c is curved, it may be convex or concave.

The two end portions of the front end face 46c in the X direction may gradually recede in the Y direction so as to form a curved front end face 46c protruding in the direction opposite to the Y direction in the drawing.

With this structure, the front end face 46c and the side faces of the upper core layer 46 become continuous, thereby reducing the leakage of magnetic flux between the upper core layer 46 and the upper gap layer 43. Thus, side fringing can be further decreased.

Alternatively, the front end face 46c of the upper core layer 46 may be parallel to the opposing face.

As shown in FIG. 2, the width of the upper core layer 46 at the end portion connected to the upper magnetic pole layer 25 is larger than the width in the track width direction of the upper magnetic pole layer 25. With this structure, the magnetic flux from the upper core layer 46 can be efficiently fed to the upper magnetic pole layer 25 and the recording characteristics can be improved.

The width of the upper core layer 46 in the track width direction at the region where the upper core layer 46 overlays the magnetic pole unit 21 is preferably 1.5 to 3.0 times the width of the magnetic pole unit 21 in the track width direction. At such a width, the upper core layer 46 can reliably overlay the entire top face of the magnetic pole unit 21 when the upper core layer 46 is formed on the magnetic pole unit 21. Moreover, the magnetic flux from the upper core layer 46 can be efficiently supplied to the upper gap layer 43.

Figure 7:
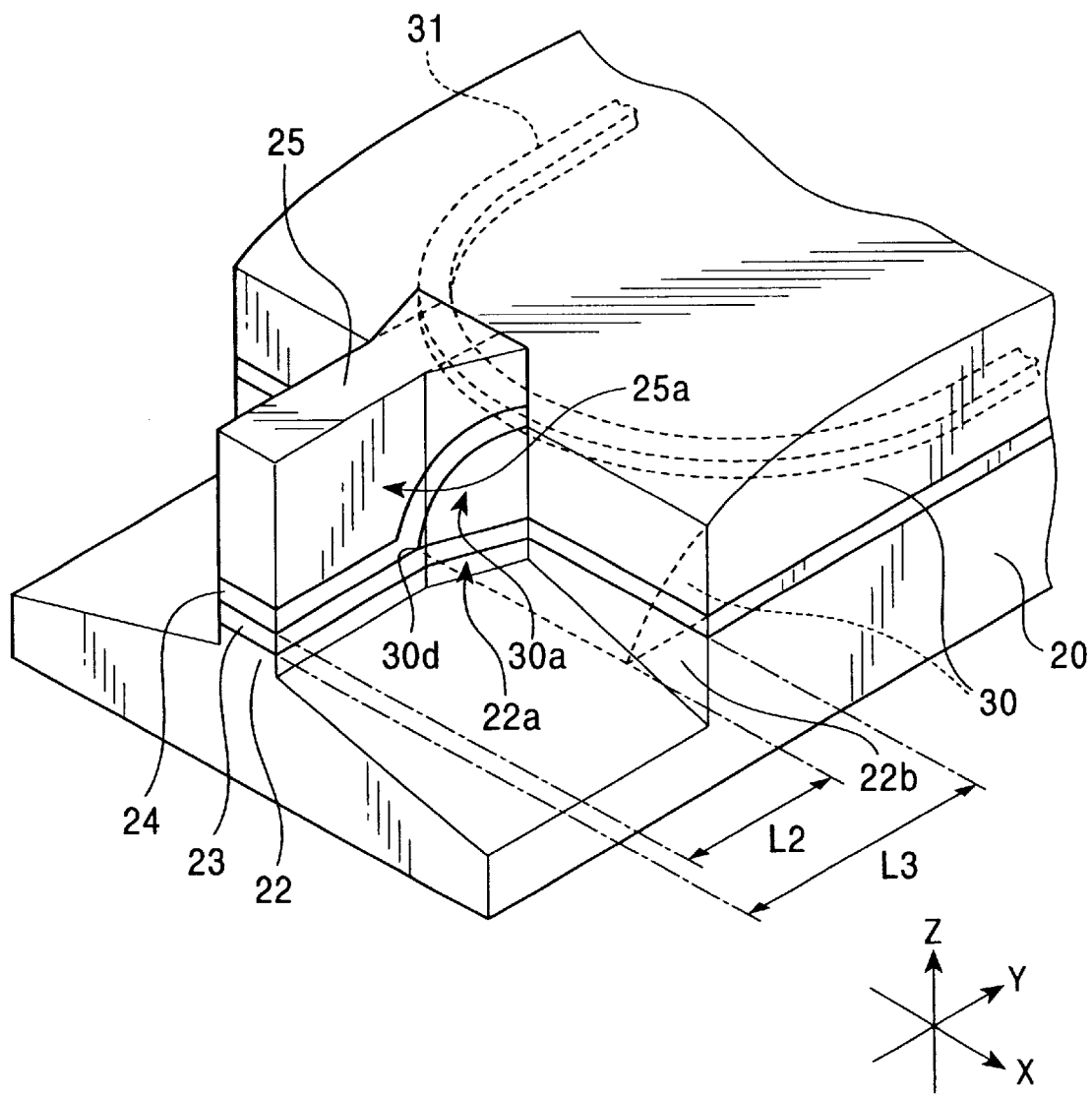
FIG. 7 is a partial perspective view of a thin-film magnetic head according to a fifth embodiment of the present invention.
Figure 8:
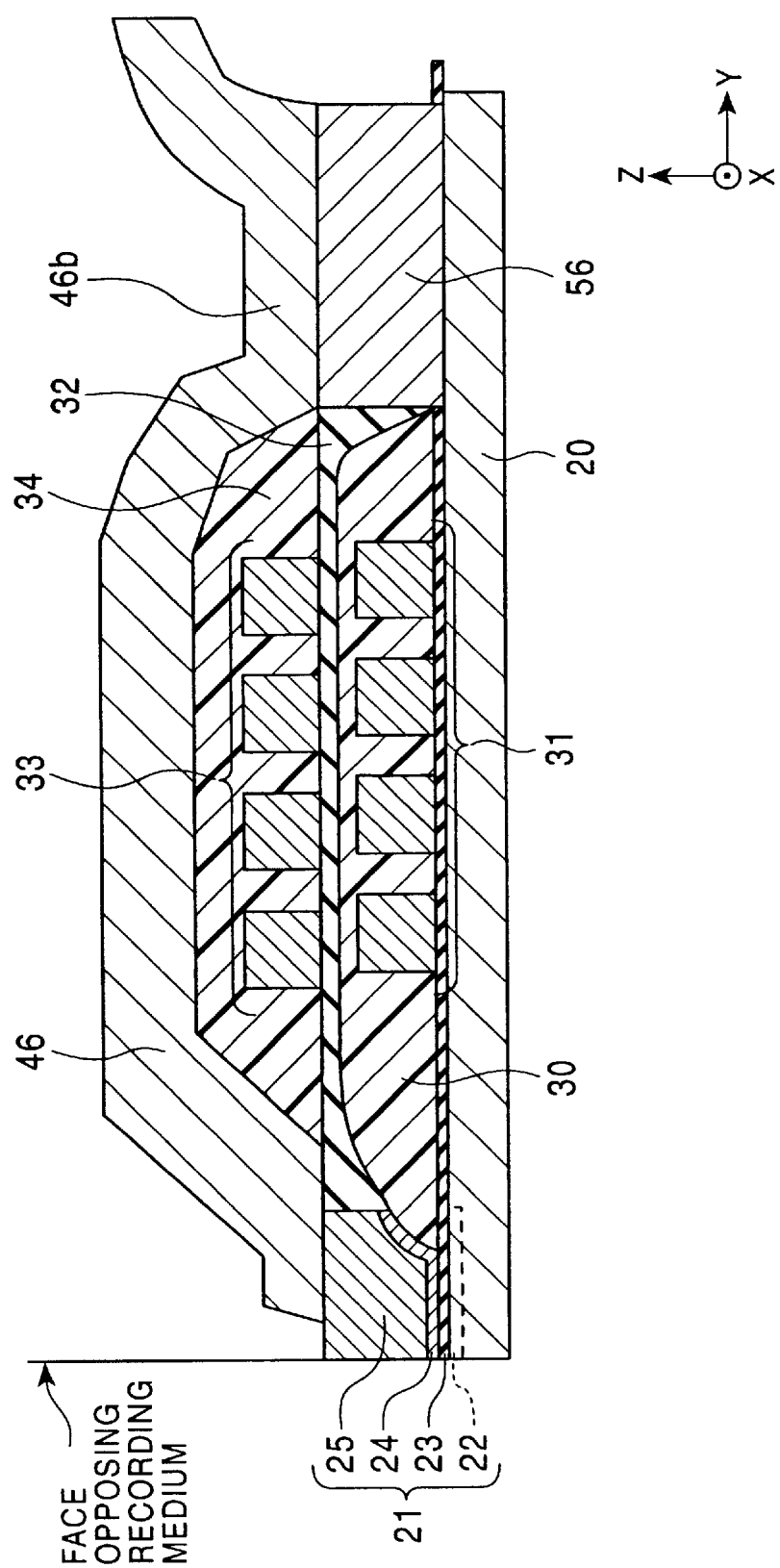
FIG. 8 is a partial vertical cross-sectional view of the thin-film magnetic head shown in FIG. 7.

FIG. 7 is partial perspective view showing a thin-film magnetic head according to a fifth embodiment of the present invention. For the purpose of explanation, some components such as the upper core layer 46 are omitted from the drawing. FIG. 8 is a cross-sectional view of the thin-film magnetic head shown in FIG. 7.

The fifth embodiment differs from the first to fourth embodiments shown in FIGS. 1 to 6 in that a Gd defining layer 30 functions as an insulating layer covering a first coil layer 31 formed behind the Gd defining layer 30 in the height direction (the Y direction in the drawing). In the drawing, only one turn of the first coil layer 31 is illustrated.

As shown in FIG. 7, the portion of the Gd defining layer 30 shown by dotted lines is milled so as to make the two side faces 25a of the upper magnetic pole layer 25 flush with two side faces 30a of the Gd defining layer 30 in the track width direction (the X direction in the drawing).

The two side faces 22a of the lower magnetic pole section 22 in the track width direction (the X direction in the drawing) formed under the Gd defining layer 30 are also flush with the two side faces 25a of the upper magnetic pole layer 25 and the two side faces 30a of the Gd defining layer 30. The side faces 30a and 22a are flush with each other and are closer to the opposing face than the region where the first coil layer 31 is formed.

Since the lower magnetic pole section 22 does not protrude from the two sides of the upper magnetic pole layer 25, side writing can be suitably prevented even with a small gap depth for higher recording density determined by the length L2. The length L2 is the distance from the opposing face to a front end 30d of the Gd defining layer 30.

The length L3 of the portion of the lower magnetic pole section 22 flush with the side faces 25a of the upper magnetic pole layer 25, i.e., the distance in the height direction from the opposing face up to the recess forming faces 22b is preferably 0.6 μm or more so as to suitably prevent side writing.

As shown in FIGS. 7 and 8, the lower magnetic pole section 22 projecting toward the upper magnetic pole layer 25 is formed on the lower core layer 20. The gap layer 23 is formed on the lower magnetic core layer 22 and the spirally wound first coil layer 31 is formed on the gap layer 23. The gap layer 23 is preferably made of an insulative material comprising at least one material selected from AlO, Al$_2$O$_3$, SiO$_2$, Ta$_2$O$_5$, TiO, AlN, AlSiN, TiN, SiN, Si$_3$N$_4$, NiO, WO, WO$_3$, BN, CrN, and SiON.

The Gd defining layer 30 is formed on the gap layer 23 and extends from a position a predetermined length L2 behind the opposing face in the height direction (the Y direction in the drawing). The Gd defining layer 30 also functions as an insulating layer covering the first coil layer 31. The Gd defining layer 30 is composed of an organic insulative material such as resist.

As shown in FIG. 7, the plating base layer 24 is formed to overlay the gap layer 23 and part of the Gd defining layer 30. The upper magnetic pole layer 25 is plated on the plating base layer 24.

As shown in FIG. 8, the insulating layer 32 made of an organic insulative material or the like is formed behind the upper magnetic pole layer 25 in the height direction (the Y direction in the drawing) and over the Gd defining layer 30. The top face of the insulating layer 32 is flush with the top face of the upper magnetic pole layer 25.

A second coil layer 33 wound into a spiral is formed on the insulating layer 32. The second coil layer 33 is covered with an insulating layer 34 made of an organic insulative material such as resist, for example. The upper core layer 46 is formed over the upper magnetic pole layer 25, the insulating layer 32, and the insulating layer 34 by frame plating, for example. The rear anchor 46b of the upper core layer 46 is magnetically connected to the planarizing layer 56 formed on the lower core layer 20.

Figure 9:
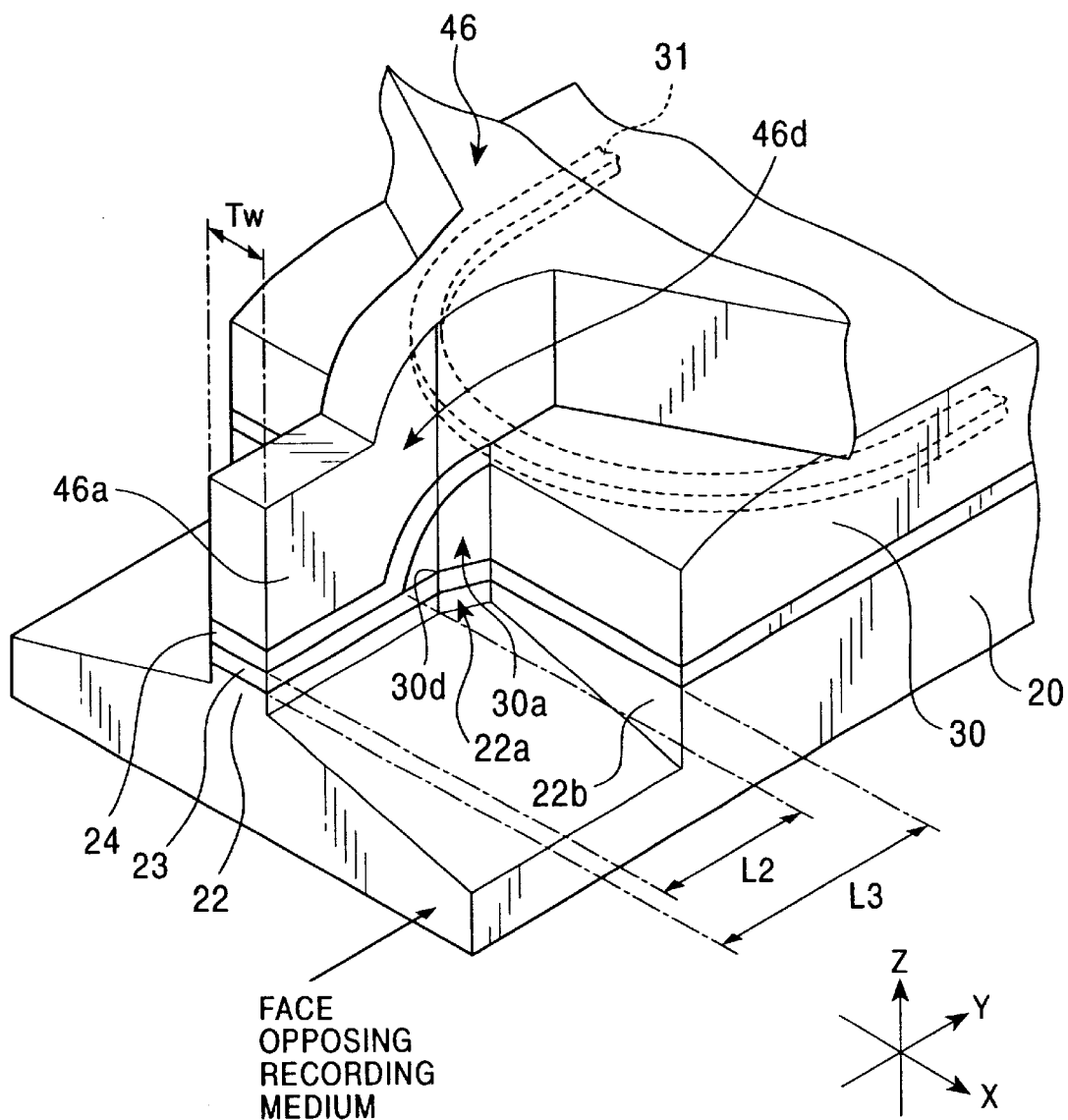
FIG. 9 is a partial perspective view of a thin-film magnetic head according to a sixth embodiment of the present invention.

FIG. 9 is a vertical cross-sectional view showing a part of a thin-film magnetic head according to a sixth embodiment of the present invention.

The thin-film magnetic head of the sixth embodiment shown in FIG. 9 is similar to that of the fifth embodiment shown in FIG. 7 in that the Gd defining layer 30 not only defines the gap depth (Gd) but also functions as an insulating layer covering the first coil layer 31 formed behind the Gd defining layer 30 in the height direction (the Y direction in the drawing).

In the sixth embodiment shown in FIG. 9, no upper magnetic pole layer 25 is formed. The front end portion 46a of the upper core layer 46 is formed on the plating base layer 24 which overlays the gap layer 23 and part of the Gd defining layer 30.

The width of the front end portion 46a of the upper core layer 46 at the opposing face in the X direction is defined as the track width Tw.

As shown in FIG. 9, the width of the upper core layer 46 gradually increases as the upper core layer 46 extends in the height direction (the X direction in the drawing) from the front end portion 46a.

In this embodiment, the front portions of the Gd defining layer 30 formed under the upper core layer 46 are partially removed so as to make the two side faces 30a flush with corresponding portions of two side faces 46d of the front end portion 46a of the upper core layer 46.

The two side faces 22a of the lower magnetic core layer 22 disposed under the Gd defining layer 30 are also flush with the two side faces 46d of the front end portion 46a and the two side faces 30a of the Gd defining layer 30.

With such a structure, a thin-film magnetic head which can suitably prevent side writing even at a small gap (Gd) L2 for higher recording density can be manufactured.

The length L3 of the portion of the lower magnetic core layer 22 flush with the side faces 36d of the upper core layer 46, i.e., the distance in the height direction from the opposing face up to the recess forming faces 22b, is preferably 0.6 µm or more so as to suitably prevent side writing.

In the sixth embodiment shown in FIG. 9, a leakage magnetic field for writing data on a recording medium is generated between the front end portion 46a of the upper core layer 46 and the lower magnetic core layer 22.

Figure 10:
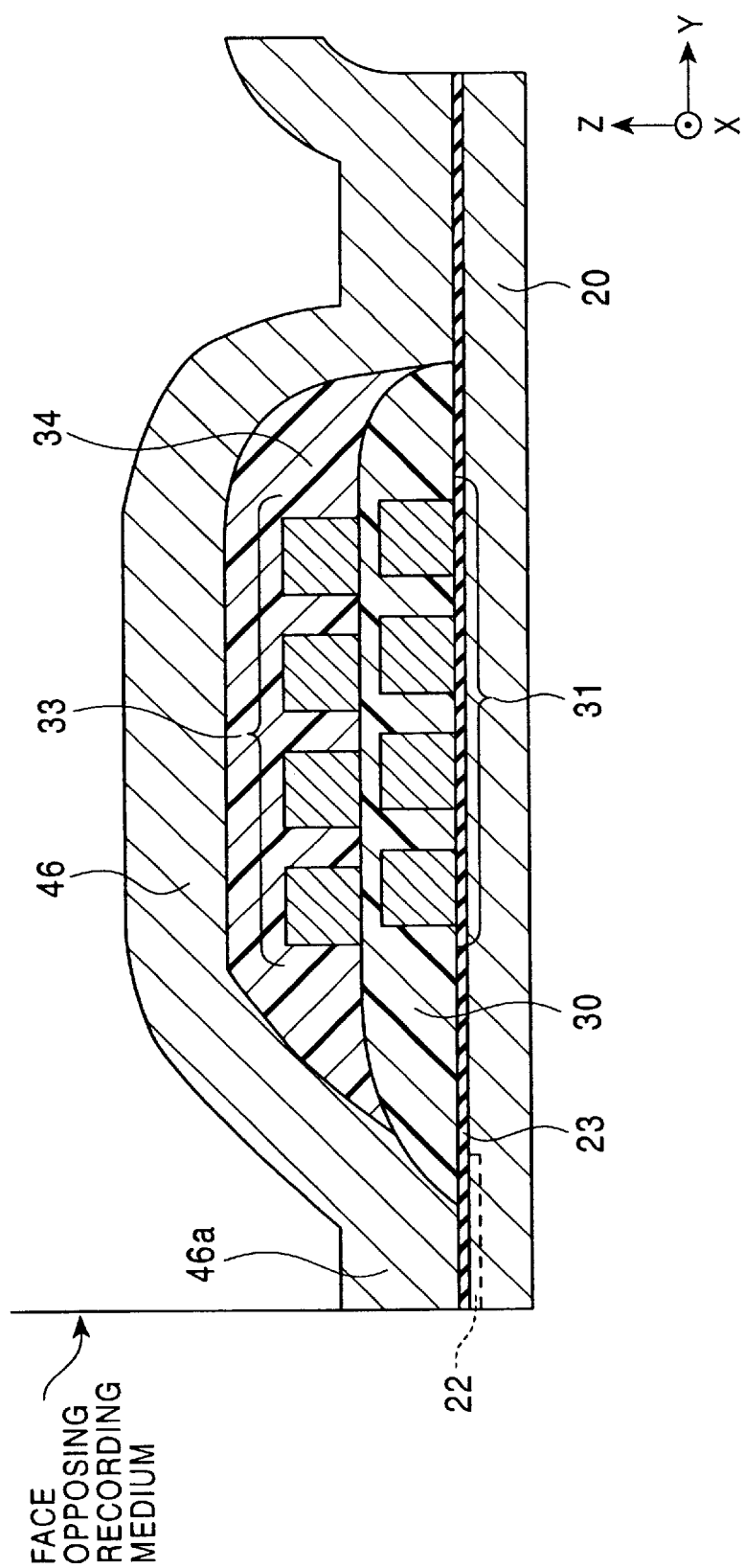
FIG. 10 is a partial vertical cross-sectional view of the thin-film magnetic head shown in FIG. 9.

As shown in FIG. 10, the spirally wound second coil layer 33 is formed on the Gd defining layer 30 and is covered with the insulating layer 34 made of an organic insulative material such as resist. The upper core layer 46 is deposited thereon.

Figure 11:
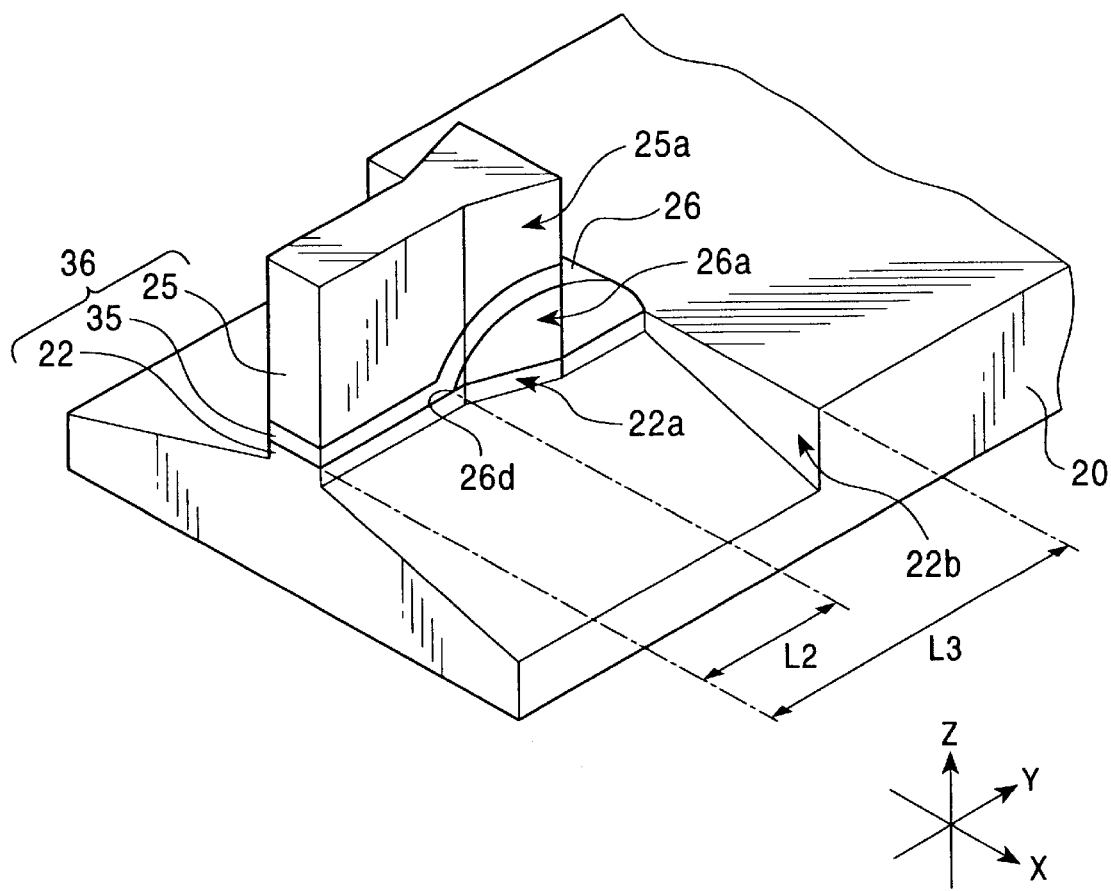
FIG. 11 is a partial perspective view of a thin-film magnetic head according to a seventh embodiment of the present invention.
Figure 12:
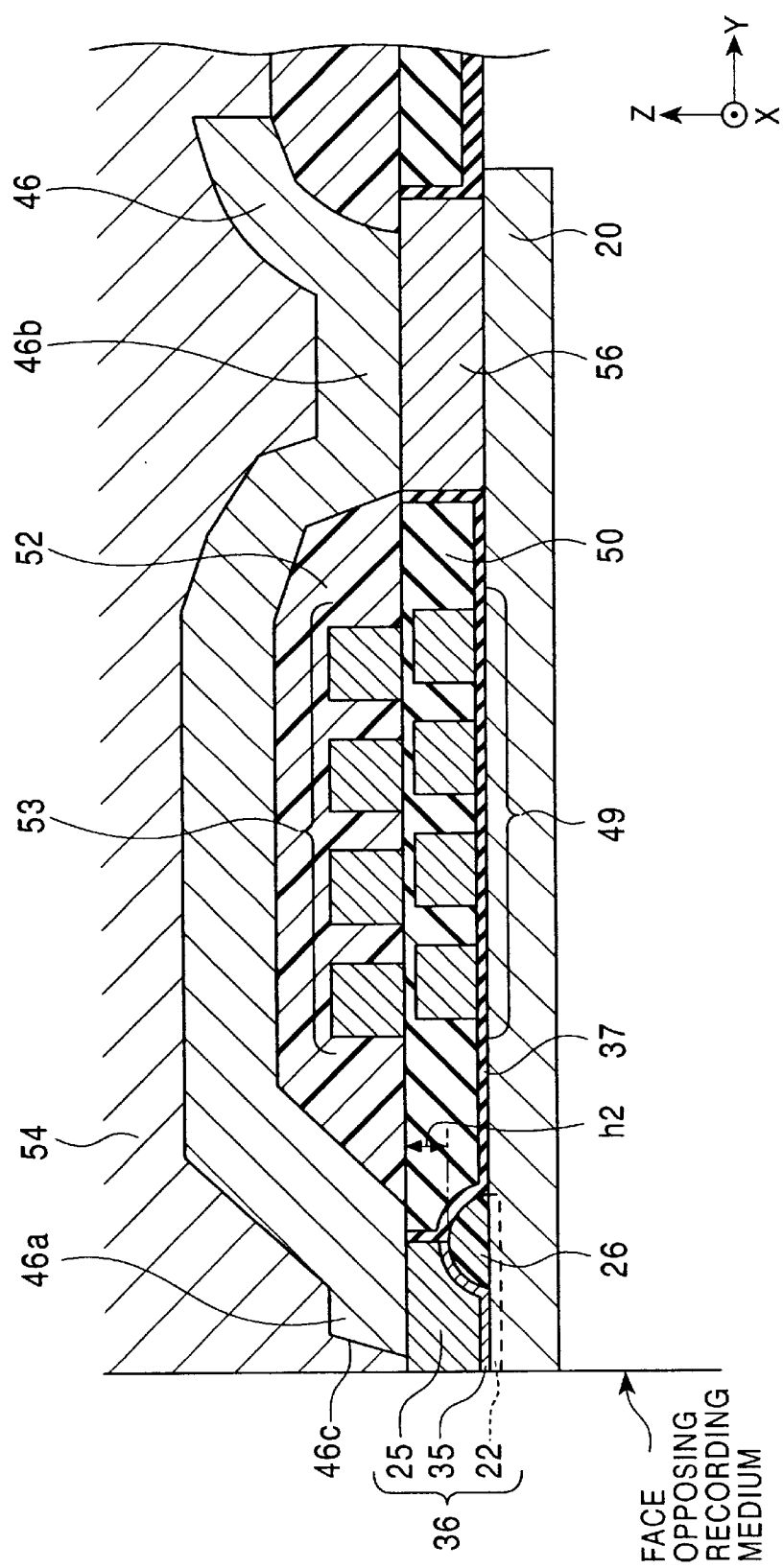
FIG. 12 is a partial vertical cross-sectional view of the thin-film magnetic head shown in FIG. 11.

FIG. 11 is a partial perspective view schematically illustrating a thin-film magnetic head according to a seventh embodiment of the present invention. FIG. 12 is a partial vertical view of the thin-film magnetic head of the seventh embodiment shown in FIG. 11.

The seventh embodiment differs from the first to sixth embodiments shown in FIGS. 1 to 10 in that a gap layer 35 is formed to overlay the lower magnetic core layer 22 up to the top of the Gd defining layer 26.

Whereas the thin-film magnetic heads of the first to sixth embodiments have the gap layer disposed under the Gd defining layer, the thin-film magnetic head of this embodiment has the gap layer 35 formed over the Gd defining layer 26. Such a difference in the position of the gap layer is due to the manufacturing process.

The thin-film magnetic head of the seventh embodiment shown in FIG. 11 includes a magnetic pole unit 36 comprising the lower magnetic core layer 22, the gap layer 35, and the upper magnetic pole layer 25. The upper magnetic pole layer 25 and the lower magnetic core layer 22 may each be a layered composite. A plating base layer may be formed between the gap layer 35 and the lower magnetic core layer 22 and between the gap layer 35 and the upper magnetic pole layer 25. The upper magnetic pole layer 25 is preferably composed of a magnetic material having a higher saturation magnetic flux density than that of the upper core layer 46.

In this embodiment, the gap layer 35 is preferably composed of a nonmagnetic metal material comprising at least one of NiP, NiPd, NiW, NiMo, NiCu, Au, Pt, Rh, Pd, Ru, and Cr. With this material, the gap layer 35 and the upper magnetic pole layer 25 can be sequentially formed by plating.

In this embodiment also, the two side faces 25a of the upper magnetic pole layer 25 in the track width direction (the X direction in the drawing) are flush with the two side faces 26a of the Gd defining layer 26 and the two side faces 22a of the lower magnetic core layer 22. The Gd defining layer 26 and the lower magnetic core layer 22 do not protrude from the two side faces 25a of the upper magnetic pole layer 25.

Since the lower magnetic core layer 22 does not protrude from the two side faces 25a of the upper magnetic pole layer 25, side writing can be suitably prevented even at a small gap depth for higher recording density regulated by the length L2. The length L2 is the distance from the opposing face to the front end 26d of the Gd defining layer 26.

Moreover, in this embodiment, the length L3 of the portion of the lower magnetic core layer 22 flush with the side faces 25a of the upper magnetic pole layer 25, i.e., the distance in the height direction from the opposing face up to the recess forming faces 22b formed by milling the surface of the lower core layer 20 is preferably 0.6 µm or more so as to suitably prevent side writing.

As described above, the Gd defining layer 26 is preferably made of an organic insulative material such as resist to facilitate the manufacturing process. Alternatively, the Gd defining layer 26 may be made of an inorganic insulative material or a nonmagnetic metal material. When the Gd defining layer 26 is made of a nonmagnetic metal material, the gap layer 35 and the upper magnetic pole layer 25 can be formed on the Gd defining layer 26 without requiring a plating base layer on the Gd defining layer 26.

Next, the structures of the components other than the magnetic pole unit 36 and the Gd defining layer 26 are explained.

As shown in FIG. 12, the spirally wound first coil layer 49 is formed behind the magnetic pole unit 36 in the height direction (the Y direction in the drawing) on the lower core layer 20 with an insulating base layer 37 therebetween. The insulating base layer 37 is preferably made of an insulative material comprising at least one of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The pitch between turns of the spiral of the first coil layer 49 is filled with the insulating layer 50. The insulating layer 50 preferably comprises at least one material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

As shown in FIG. 12, the insulating layer 50 is formed at the two sides of the magnetic pole unit 36 in the track width direction (the X direction) and is exposed at the opposing face.

Referring to FIG. 12, the spirally wound second coil layer 53 is formed on the insulating layer 50.

As shown in FIG. 12, the second coil layer 53 is covered with the insulating layer 52 composed of an organic material such as resist or polyimides. The upper core layer 46 composed of a NiFe alloy or the like is patterned on the insulating layer 52 by, for example, frame plating.

As shown in FIG. 12, the front end portion 46a of the upper core layer 46 is formed on the upper magnetic pole layer 25 and is magnetically connected thereto. The rear anchor 46b of the upper core layer 46 is magnetically connected to the planarizing layer 56 made of a magnetic material such as a NiFe alloy and formed on the lower core layer 20. The planarizing layer 56 need not be formed; in such a case, the rear anchor 46b of the liquid crystal 40 is directly connected to the lower core layer 20.

Although the thin-film magnetic head of the seventh embodiment shown in FIG. 12 comprises two coil layers, the number of coil layers may be more than two or may be one. When only one coil layer is used, the region on the lower core layer 20 behind the magnetic pole unit 36 is filled with the insulating layer 50, and the coil layer is formed on the insulating layer 50. Alternatively, the second coil layer 53 shown in FIG. 12 may be omitted and the upper core layer 46 may be directly formed on the insulating layer 50. When two or more coil layers are deposited, the distance between the opposing face and the planarizing layer 56 can be decreased so as to shorten the magnetic path and decrease inductance. Thus, the recording characteristics at radio frequencies can be improved.

Moreover, as shown in FIG. 12, the front end face 46c of the upper core layer 46 is not exposed at the opposing face but is formed behind the opposing face in the height direction (the Y direction in the drawing). With this structure, side fringing can be suitably decreased, and a thin-film magnetic head capable of meeting needs of higher recording density can be manufactured.

Alternatively, the front end face 46c of the upper core layer 46 may be exposed at the opposing face.

As shown in FIG. 12, the front end face 46c of the upper core layer 46 may be tilted in the Y direction as the front end face 46c extends in the Z direction from the lower core layer 20 toward the upper core layer 46. The front end face 46c may be flat or curved. If the front end face 46c is curved, it may be convex or concave.

The two end portions of the front end face 46c in the X direction may gradually recede in the Y direction so as to form a curved front end face 46c protruding in the direction opposite to the Y direction in the drawing.

With this structure, the front end face 46c and the side faces of the upper core layer 46 become continuous, thereby decreasing leakage of magnetic flux between the upper core layer 46 and the upper gap layer 43. Thus, side fringing can be further decreased.

Alternatively, the front end face 46c of the upper core layer 46 may be parallel to the opposing face.

As shown in FIG. 12, the width of the upper core layer 46 at the end portion connected to the upper magnetic pole layer 25 is larger than the width in the track width direction of the upper magnetic pole layer 25. With this structure, the magnetic flux from the upper core layer 46 can be efficiently fed to the upper magnetic pole layer 25 and the recording characteristics can be improved.

The width of the upper core layer 46 in the track width direction at the region where the upper core layer 46 overlays the magnetic pole unit 36 is preferably 2.0 to 2.5 times the width of the magnetic pole unit 36 in the track width direction. At such a width, the upper core layer 46 can reliably overlay the entire top face of the magnetic pole unit 36 when the upper core layer 46 is formed on the magnetic pole unit 36. Moreover, the magnetic flux from the upper core layer 46 can be efficiently supplied to the upper gap layer 43.

The vertical cross-sectional shape of the Gd defining layer 26 will now be described. The Gd defining layer 26 shown in each of FIGS. 1 to 5 and FIG. 11 has a semi-elliptic vertical cross-section as shown in the drawings. Note that the cross-section is taken along the plane defined by the Y direction and the Z direction in the drawing.

The Gd defining layer 26 shown in FIG. 6 has a semi-elliptic vertical cross-section at the portion overlaid by the upper magnetic pole layer 25. The back face 26c of the Gd defining layer 26 protruding in the height direction (the Y direction in the drawing) from the back face 25c of the upper magnetic pole layer 25 is formed as a declining slope as the back face 26c extends in the height direction (the Y direction in the drawing) from the upper magnetic pole layer 25. The back face 26c may be flat or curved.

Alternatively, the back face 26c may not protrude from the back face 25c of the upper magnetic pole layer 25. In such a case, the Gd defining layer 26 is formed directly under the upper magnetic pole layer 25 only, and the Gd defining layer 26 has a quarter-elliptic vertical cross-section.

Figure 13:
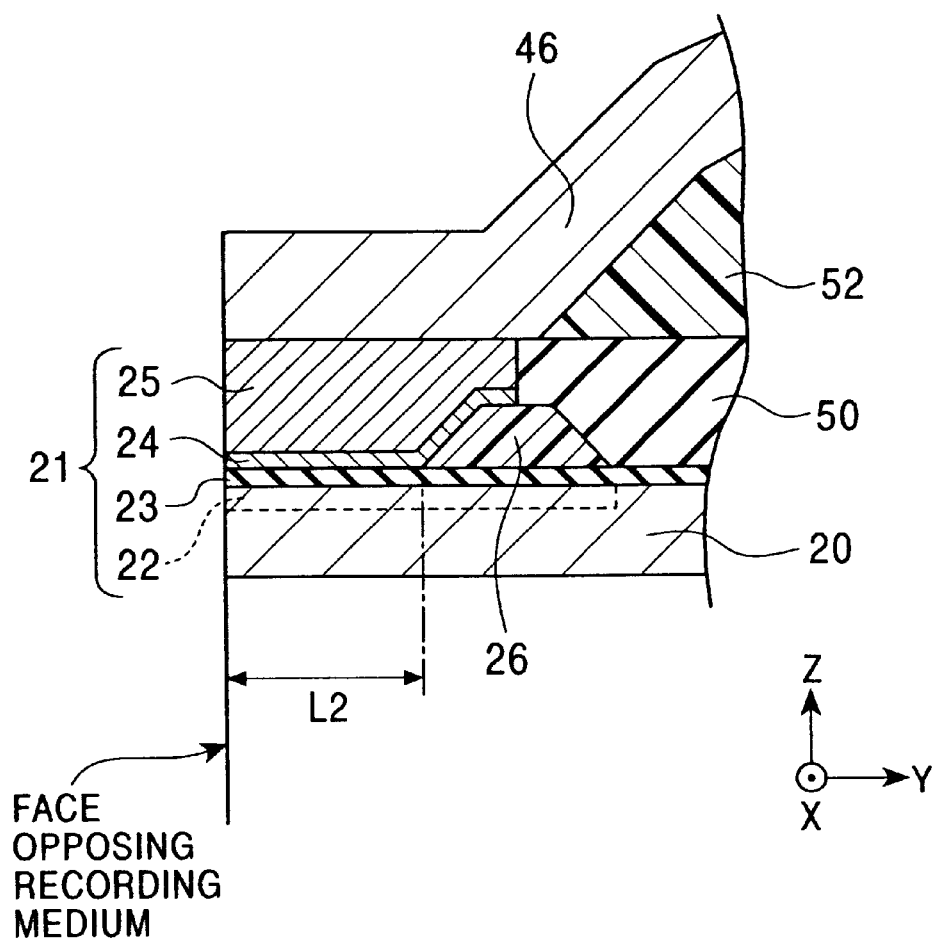
FIG. 13 is a partial vertical cross-sectional view of the vicinity of the opposing face of a thin-film magnetic head according to a modification of the present invention.

Alternatively, as shown in FIG. 13, the Gd defining layer 26 may have a substantially trapezoidal vertical cross section. The Gd defining layer 26 shown in FIG. 13 is made of an inorganic insulative material.

When the Gd defining layer 26 is composed of an inorganic insulative material, the Gd defining layer 26 can be accurately worked, thereby preventing variation in the gap depth.

Figure 14:
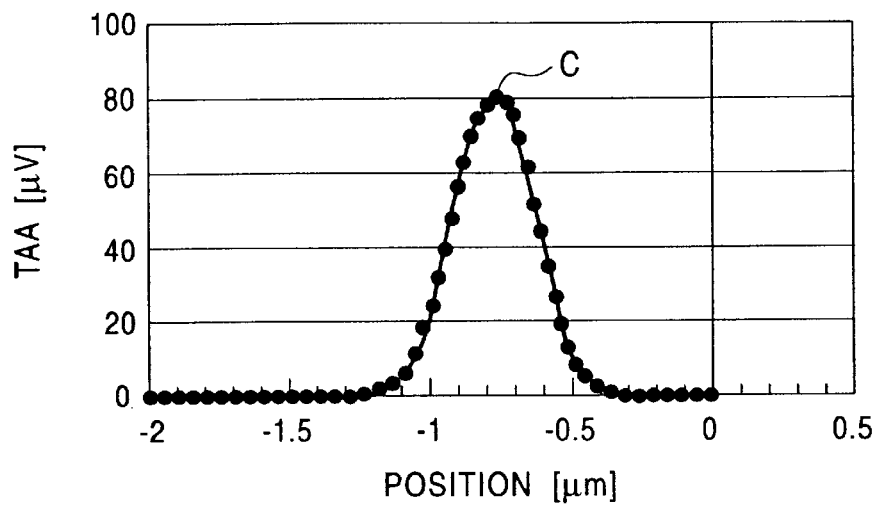
FIG. 14 is a track profile taken by reading the data recorded by the fourth embodiment of the thin-film magnetic head with a magnetoresistive head.

FIG. 14 is a graph showing a track profile taken by actually reading data written on a recording medium by using a MR head comprising the thin-film magnetic head of the fourth embodiment shown in FIG. 6. In the experiment, data was recorded using the thin-film magnetic head having a skew angle, i.e., an inclination with respect to the tangential direction of the motion of the recording medium, and was read using the MR head.

Figure 30:
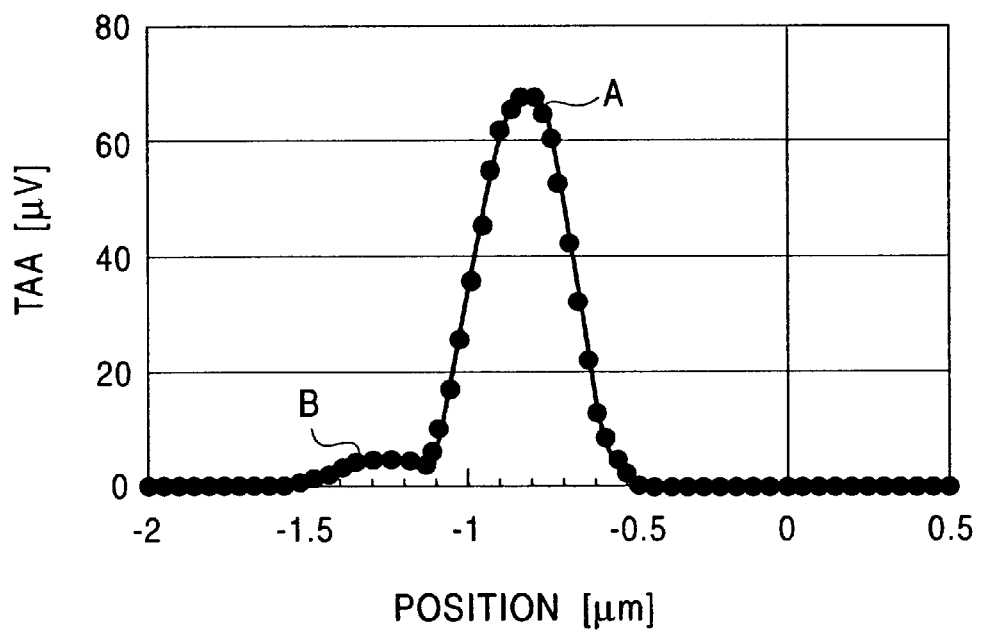
FIG. 30 is a track profile taken by reading the data with a magnetoresistive head, the data recorded using the conventional thin-film magnetic head.

Referring to FIG. 14, the track profile only has peak C. No noise waveforms are observed as in the conventional art (c.f. FIG. 30).

As is apparent from the above description, the thin-magnetic head of the present invention has superior recording characteristics, for example, produces less noise, compared to the conventional head, while preventing side writing.

A method for manufacturing the thin-film magnetic head of the first embodiment shown in FIG. 1 will now be explained with reference to FIGS. 15 to 24. FIGS. 15, 16, and 21 to 24 are vertical cross-sectional views of the thin-film magnetic head. FIGS. 17 to 20 are partial perspective views of the thin-film magnetic head. In the description below, the term "opposing face" refers to a face which is located at the closest position to the recording medium in each of the manufacturing steps.

Figure 15:
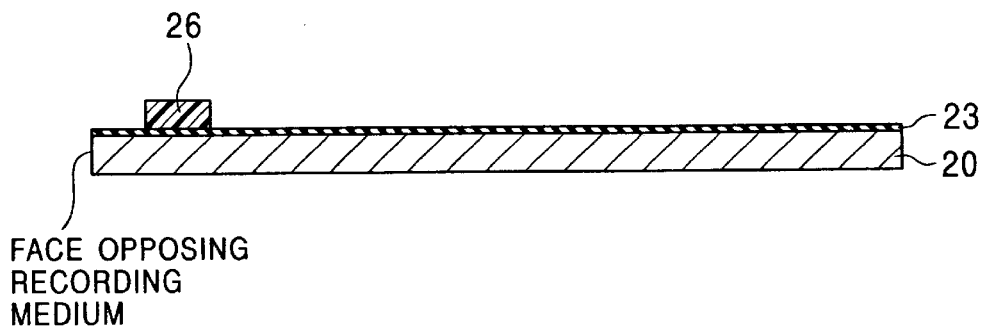
FIG. 15 is a diagram illustrating a step of a method for manufacturing the thin-film magnetic head of the present invention.

In the step shown in FIG. 15, the gap layer 23 is deposited on the lower core layer 20 composed of a magnetic material by sputtering. Subsequently, the Gd defining layer 26 composed of a UV curable resin or the like is formed on the gap layer 23. The gap layer 23 is preferably composed of an inorganic insulative material comprising at least one selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Figure 16:
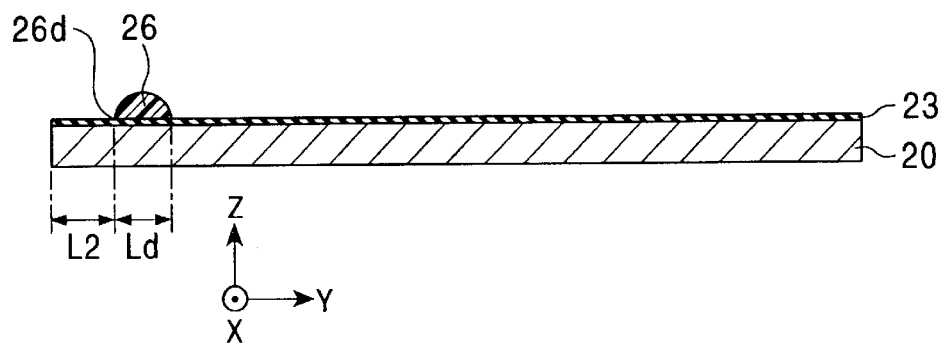
FIG. 16 is a diagram illustrating another step of the method for manufacturing the thin-film magnetic head of the present invention.

The Gd defining layer 26 is formed by first shaping the resist layer comprising the UV curable resin into a rectangular shape shown in FIG. 15 and then baking the resist layer to allow the resist layer to sag, as shown in FIG. 16. The resulting Gd defining layer 26 has a curved front end face receding in the Y direction as the front end face extends in the Z direction. The resulting Gd defining layer 26 is then cured by UV irradiation. Note that the gap depth (Gd) is determined by the length L2 which is the distance from the front end 26d of the Gd defining layer 26 to the opposing face. At this flat face having the length L2, the upper magnetic pole layer 25 connects to the gap layer 23. The gap depth (Gd) is preferably in the range of 0.2 μm to 0.6 μm. The total length Ld of the Gd defining layer 26 in the height direction (the Y direction in the drawing) is approximately 3.0 μm to 6.0 μm.

Next, the plating base layer 24 is deposited on the gap layer 23 and the Gd defining layer 26 by sputtering or the like.

Figure 17:
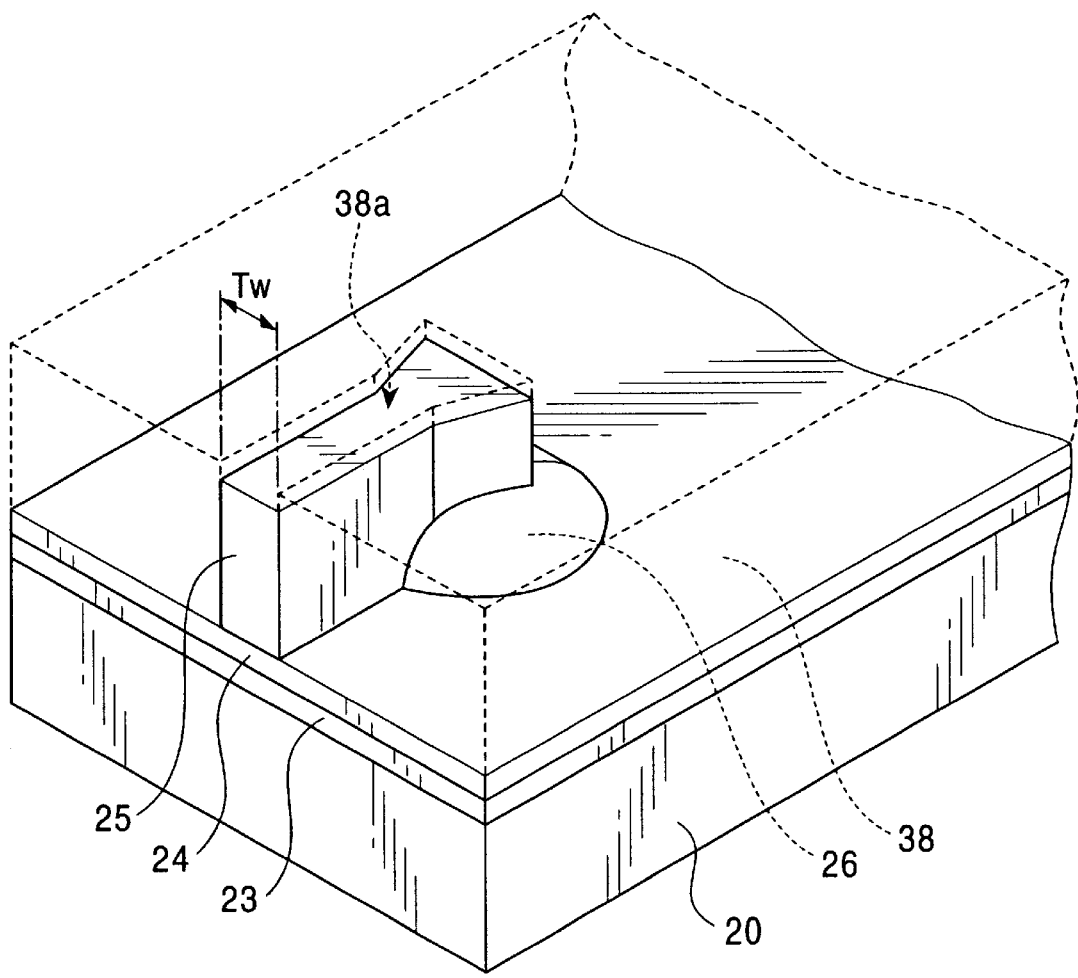
FIG. 17 is a diagram illustrating another step of the method for manufacturing the thin-film magnetic head of the present invention.

Next, as shown in FIG. 17, a resist layer 38 is formed on the plating base layer 24 by application, and is exposed and developed so as to make an opening 38a having a predetermined length in the height direction (the Y direction in the drawing) and a width in the track width direction (the X direction in the drawing) smaller than the width of the Gd defining layer 26. The width of the opening 38a in the track width direction (the X direction in the drawing) is regulated as the track width Tw. The back end portion of the opening 38a in the height direction is at least formed on the Gd defining layer 26.

The opening 38a exposes the plating base layer 24. A magnetic material is plated on the plating base layer 24 to deposit upper magnetic pole layer 25. Subsequently, the resist layer 38 is removed.

Figure 18:
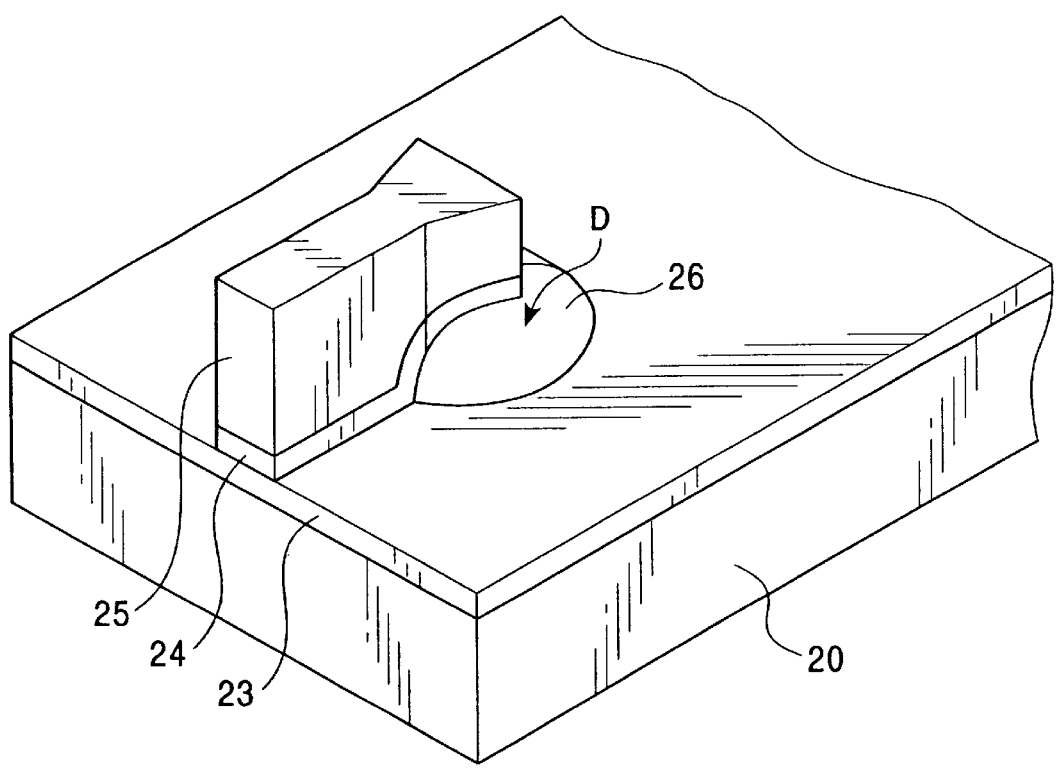
FIG. 18 is a diagram illustrating another step of the method for manufacturing the thin-film magnetic head of the present invention.

In the next step shown in FIG. 18, the plating base layer 24 formed on the Gd defining layer 26 and the gap layer 23 is removed by a known method such as ion milling to expose portions of the Gd defining layer 26 and the gap layer 23 not overlaid by the upper magnetic pole layer 25. As a result, the plating base layer 24 only remains at the region overlaid by the upper magnetic pole layer 25.

Next, a portion D of the Gd defining layer 26 protruding in the track width direction (the X direction) from the two sides of the upper magnetic pole layer 25 shown in FIG. 18 is removed by a chemical etching process such as reactive ion etching (RIE) or ashing. The resulting Gd defining layer 26 is demonstrated in FIG. 19.

Chemical etching processes such as RIE (plasma etching) and ashing are employed because physical processes such as ion milling do not adequately remove the Gd defining layer 26 and remove unintended portions such as upper magnetic pole layer 25.

In etching the Gd defining layer 26, selection of a gas used in RIE or ashing is important. Deformation or melting of the upper magnetic pole layer 25 during RIE or ashing must be prevented. In this invention, $O_2$ or $O_2+CF_4$ is preferably used in RIE or ashing.

The processes such as RIE or ashing using these gasses do not adversely affect the upper magnetic pole layer 25, and the upper magnetic pole layer 25 can properly function as a mask for chemically and selectively removing the portions of the Gd defining layer 26 protruding in the track width direction (the X direction in the drawing) from the two side faces 25a of the upper magnetic pole layer 25.

Figure 19:
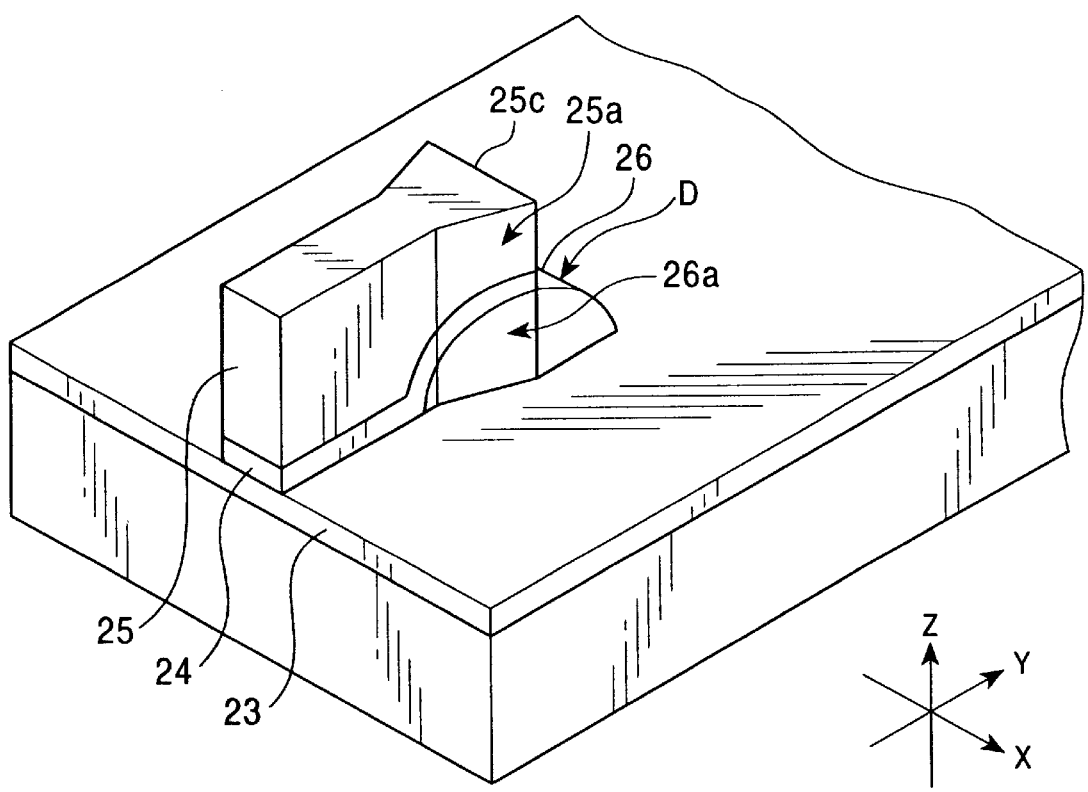
FIG. 19 is a diagram illustrating another step of the method for manufacturing the thin-film magnetic head of the present invention.

As a result, as shown in FIG. 19, the portions of the Gd defining layer 26 protruding in the track width direction (the X direction) from the two side faces of the upper magnetic pole layer 25 can be removed, and the two side faces 26a of the Gd defining layer 26 become flush with the two side faces 25a of the upper magnetic pole layer 25.

In removing the Gd defining layer 26 by RIE or ashing, the angle of etching is preferably substantially perpendicular to the surface of the lower core layer 20, i.e., parallel to the Z direction in the drawing.

During the step of removing the protruding side portions of the Gd defining layer 26, the portion D of the Gd defining layer 26 protruding in the height direction (the Y direction in the drawing) from the back face 25c of the upper magnetic pole layer 25 may also be removed by RIE or ashing so as to shape the back face 26c of the Gd defining layer 26 as in FIG. 6.

All of the portions of the Gd defining layer 26 protruding in the track width direction (the X direction) from the side faces of the upper magnetic pole layer 25 are preferably removed to inhibit side writing and simplify the manufacturing process. Alternatively, only a front portion (a portion close to the opposing face) of the protruding portion of the Gd defining layer 26 may be selectively removed. In this case, the Gd defining layer 26 has the shape shown in FIG. 4, for example.

Figure 20:
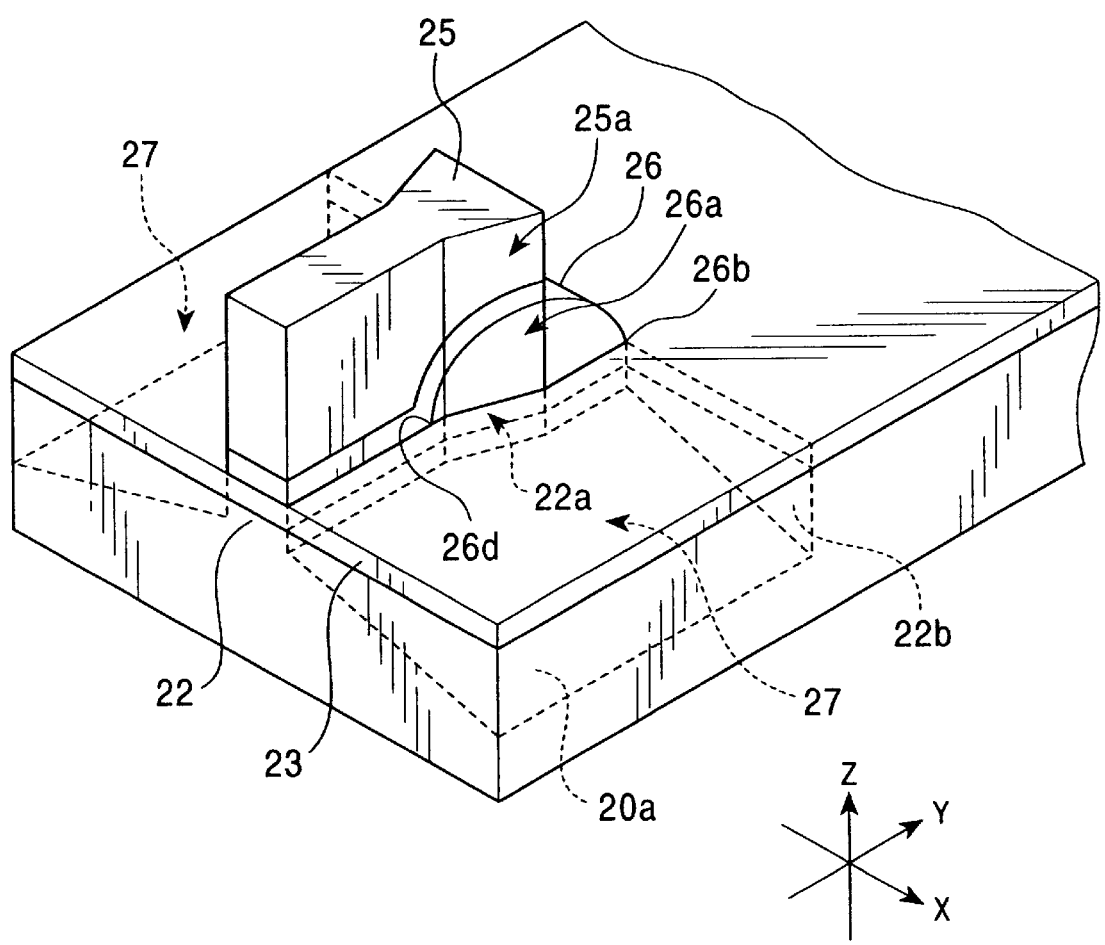
FIG. 20 is a diagram illustrating another step of the method for manufacturing the thin-film magnetic head of the present invention.

Subsequent to the step shown FIG. 19, in the step shown in FIG. 20, the portions of the gap layer 23 at the two sides of the upper magnetic pole layer 25 in the track width direction (the X direction in the drawing) are selectively and physically removed by ion milling so as to expose the surfaces of the lower core layer 20. The surfaces of the lower core layer 20 are milled to a predetermined depth with ions, as indicated by dotted lines in FIG. 20.

By milling the surfaces of the portions of the lower core layer 20 extending at the two sides of the upper magnetic pole layer 25 in the track width direction (the X direction in the drawing) with ions, the lower magnetic core layer 22 protruding from the surface of the lower core layer 20 toward the upper magnetic pole layer 25 can be formed. The protruding lower magnetic core layer 22 can prevent side fringing.

As is described above with reference to the step shown in FIG. 19, since the portions of the Gd defining layer 26 protruding from the two side faces of the upper magnetic pole layer 25 in the track width direction (the X direction) are removed, the entire portions of the lower core layer 20 at the two sides of the upper magnetic pole layer 25 in the track width direction can be suitably milled during the step of ion milling shown in FIG. 20.

In contrast, the conventional process does not include the step shown in FIG. 19, and the step of ion milling shown in FIG. 20 is performed after the step shown in FIG. 18. As a result, the portion of the lower core layer 20 overlaid by the portions of the Gd defining layer 26 protruding from the two side faces of the upper magnetic pole layer 25 in the track width direction remain so as to function as the lower magnetic core layer 22 protruding in the track width direction from the two sides of the upper magnetic pole layer 25.

In the manufacturing process of the present invention, the step shown in FIG. 19 is provided to remove the protruding portions of the Gd defining layer 26 so as to avoid the disadvantage of having the lower magnetic core layer 22 protruding from the two side faces of the upper magnetic pole layer 25.

According to the present invention, the two side faces 22a of the lower magnetic core layer 22 overlaid by the Gd defining layer 26 can be made flush with the two side faces 25a of the upper magnetic pole layer 25 and the two side faces 26a of the Gd defining layer 26. According to the present invention, a thin-film magnetic head having a lower magnetic core layer 22 not protruding from two side faces 25a of the upper magnetic pole layer 25 in the track width direction can be manufactured, which cannot be manufactured by the conventional process.

Preferably, in the present invention, the etching direction during removing the gap layer 23 by ion milling in the step shown in FIG. 20 is substantially perpendicular relative to the surface of the lower core layer 20.

Moreover, the direction of etching for milling the surface of the lower core layer 20 with ions is preferably tilted by approximately 40° to 60° with respect to the axis perpendicular to the initial surface of the lower core layer 20 before milling. At such a direction of etching, matters redeposited on the two side faces 25a of the upper magnetic pole layer 25 can be removed, and each top face 20a of the lower core layer 20 can be tilted so as to be gradually distant from the upper magnetic pole layer 25 as the top face 20a extends from the upper magnetic pole layer 25. In this manner, side fringing can be suitably prevented.

Note that in the step shown in FIG. 20, the portions of the lower core layer 20 at the two sides of the upper magnetic pole layer 25 in the track width direction (the X direction in the drawing) are milled with ions to form the recesses 27 and the recess forming faces 22b formed at the back end of the recesses 27 in the height direction. In FIG. 20, each of the recess forming faces 22b is arranged at substantially the same position as that of the back end 26b of the Gd defining layer 26. However, the recess forming face 22b need be formed at a position behind the front end 26d of the Gd defining layer 26 in the height direction (the Y direction in the drawing).

The embodiment having the recess forming face 22b formed between the back end 26b and the front end 26d of the Gd defining layer 26 is shown in FIG. 5 as an example.

Figure 21:
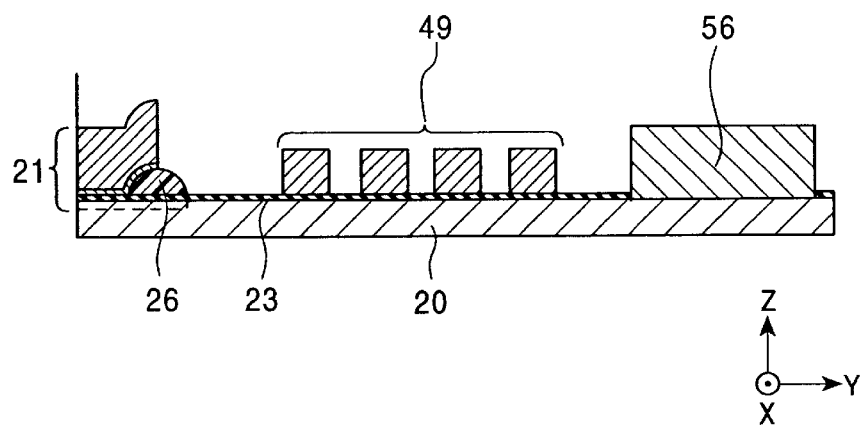
FIG. 21 is a diagram illustrating another step of the method for manufacturing the thin-film magnetic head of the present invention.

In the next step shown in FIG. 21, the planarizing layer 56 is formed on the lower core layer 20 behind the magnetic pole unit 21 in the height direction (the Y direction in the drawing) using resist, and the spirally wound first coil layer 49 is patterned on the portion of the gap layer 23 between the magnetic pole unit 21 and the planarizing layer 56.

Figure 22:
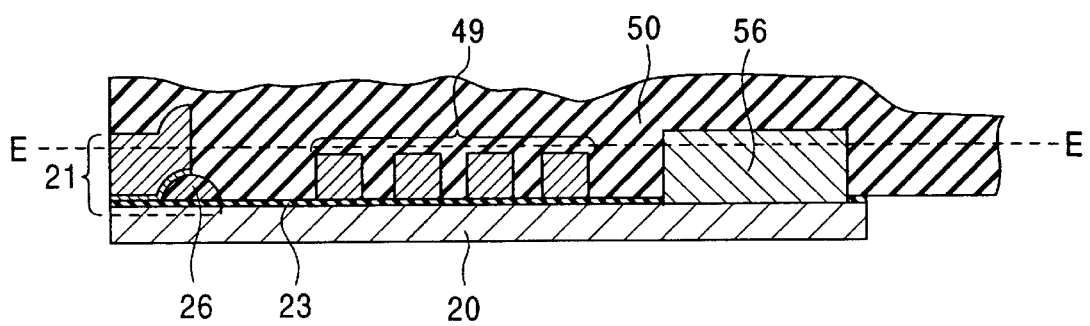
FIG. 22 is a diagram illustrating another step of the method for manufacturing the thin-film magnetic head of the present invention.

In the next step shown in FIG. 22, the first coil layer 49, the magnetic pole unit 21, and the planarizing layer 56 are covered with the insulating layer 50.

In this method, the insulating layer 50 is formed by sputtering an inorganic material. The inorganic material preferably comprises at least one material selected from the group consisting of $Al_2O_3$, SiN, and $SiO_2$.

Figure 23:
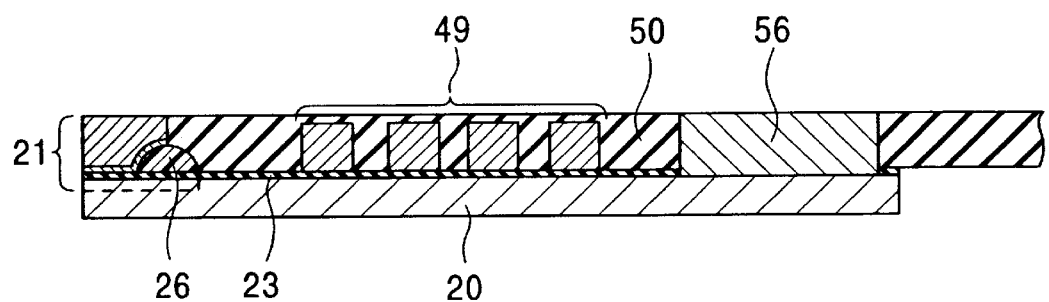
FIG. 23 is a diagram illustrating another step of the method for manufacturing the thin-film magnetic head of the present invention.

In the step shown in FIG. 22, the surface of the insulating layer 50 is polished by chemical mechanical polishing (CMP) or the like to line E—E at which the surface of the magnetic pole unit 21 is exposed. FIG. 23 demonstrates the state of the insulating layer 50 polished to line E—E. In this embodiment, the surface of the first coil layer 49 is not exposed at the surface of the insulating layer 50.

The surface of the insulating layer 50 is planarized so as to be flush with the top face of the magnetic pole unit 21 by polishing described above.

Figure 24:
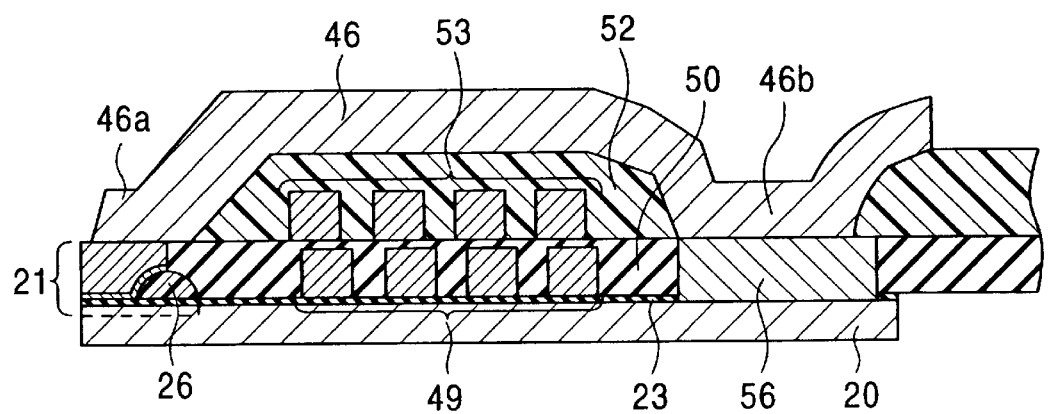
FIG. 24 is a diagram illustrating another step of the method for manufacturing the thin-film magnetic head of the present invention.

In the next step shown in FIG. 24, the spirally wound second coil layer 53 is patterned on the insulating layer 50. The first coil layer 49 is connected to the second coil layer 53 via the center of each spiral. The second coil layer 53 is covered with the insulating layer 52 composed of an organic insulative material such as resist, polyimides, or the like. The upper core layer 46 is then patterned on the insulating layer 52 by a known method such as frame plating.

As shown in FIG. 24, the upper core layer 46 comes into contact with the top face of the magnetic pole unit 21 at the front end portion 46a. The rear anchor 46b of the upper core layer 46 is in contact with the planarizing layer 56 formed on the lower core layer 20 and is magnetically connected thereto.

The thin-film magnetic head of the present invention can be manufactured through the process described above.

In order to manufacture the thin-film magnetic head shown in FIG. 7, the first coil layer 31 is formed on the gap layer 23 and the Gd defining layer 30 is formed to cover the first coil layer 31 prior to forming the Gd defining layer 30, in the step shown in FIG. 15. Subsequently, the steps shown in FIGS. 16 to 20 are performed, and then the steps shown in FIGS. 22 to 24 are performed.

In order to manufacture the thin-film magnetic head shown in FIG. 9, the layers up to the upper core layer 46 are first formed. The portions of the Gd defining layer 30 protruding in the track width direction (the X direction in the drawing) from the two side faces of the front end portion 46a of the upper core layer 46 are removed as in the step shown in FIG. 19. Subsequently, the portions of the gap layer 23 and the lower core layer 20 at the two sides of the front end portion 46a in the track width direction are milled as in the step shown in FIG. 20 so as to make the lower magnetic core layer 22.

Next, a method for manufacturing the thin-film magnetic head according to the seventh embodiment shown in FIG. 11 is explained with reference to FIGS. 25 to 27.

Figure 25:
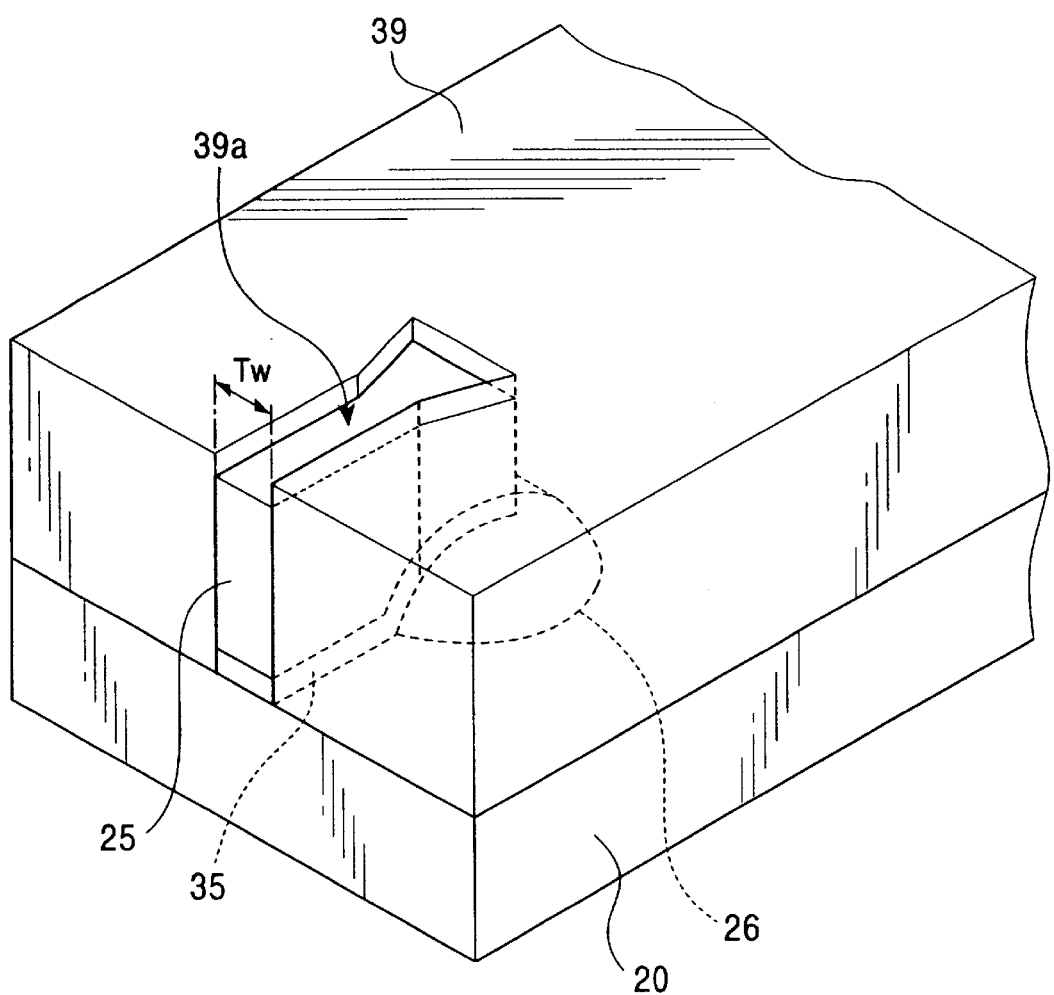
FIG. 25 is a diagram illustrating another step of the method for manufacturing the thin-film magnetic head of the present invention.
Figure 26:
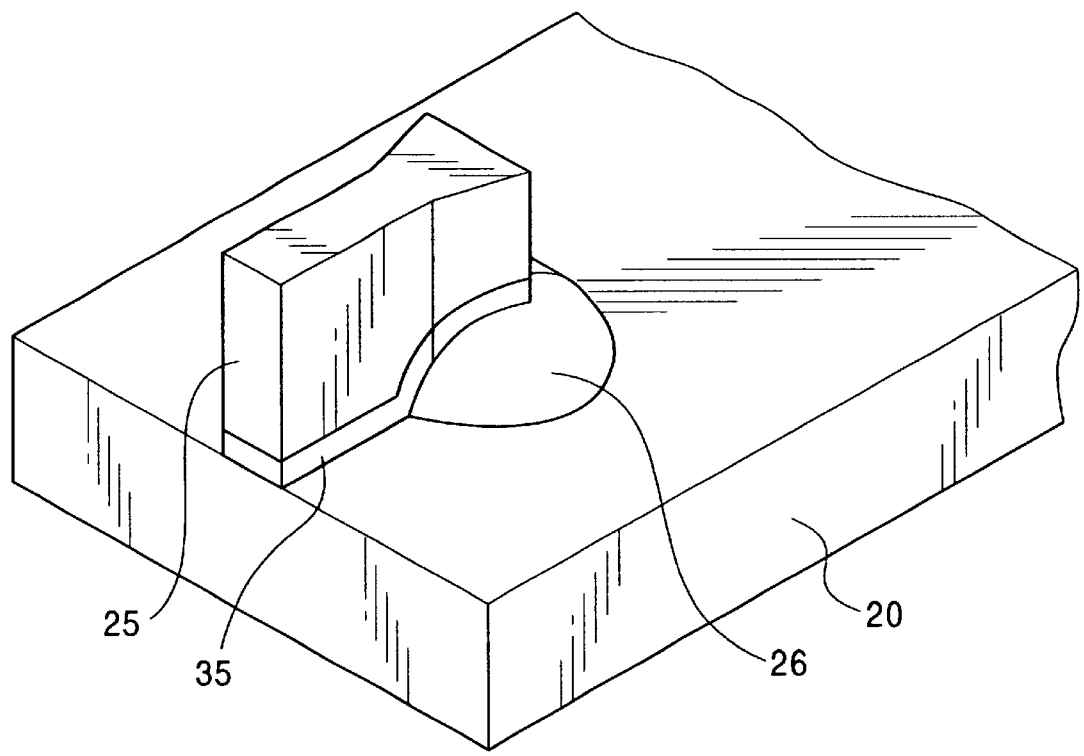
FIG. 26 is a diagram illustrating another step of the method for manufacturing the thin-film magnetic head of the present invention.

In the step shown in FIG. 25, the Gd defining layer 26 is formed on the lower core layer 20. The method described above with reference to FIGS. 15 and 16 is employed to form the Gd defining layer 26.

Next, a resist layer 39 is formed over the Gd defining layer 26 and the lower core layer 20. Alternatively, a plating base layer may be formed over the Gd defining layer 26 and the lower core layer 20 prior to forming the resist layer 39.

The resist layer 39 is exposed and developed so as to make an opening 39a which extends from the face opposing the recording medium up to the top of the Gd defining layer 26 and has a width smaller than the width of the Gd defining layer 26 in the track width direction. The width of the opening 39a in the track width direction is regulated as the track width Tw.

The gap layer 35 and the resist layer 39 are then sequentially plated in the opening 39a. The gap layer 35 is preferably composed of a nonmagnetic metal material that can be used in plating. The nonmagnetic metal material may comprise at least one of NiP, NiPd, NiW, NiMo, NiCu, Au, Pt, Rh, Pd, Ru, and Cr. The resist layer 39 is then removed. The state after removing the resist layer 39 is illustrated in FIG. 26.

Next, the steps shown in FIGS. 19 and 20 are performed. That is, as shown in FIG. 27, the portions of the Gd defining layer 26 protruding from the two side faces 25a of the upper magnetic pole layer 25 in the track width direction are removed by a chemical etching process such as RIE (plasma etching) or ashing. The gas used in RIE or ashing is suitably selected to avoid damaging the Gd defining layer 26. In this invention, the gas used in RIE or ashing is preferably $O_2$ or $O_2+CF_4$.

Figure 27:
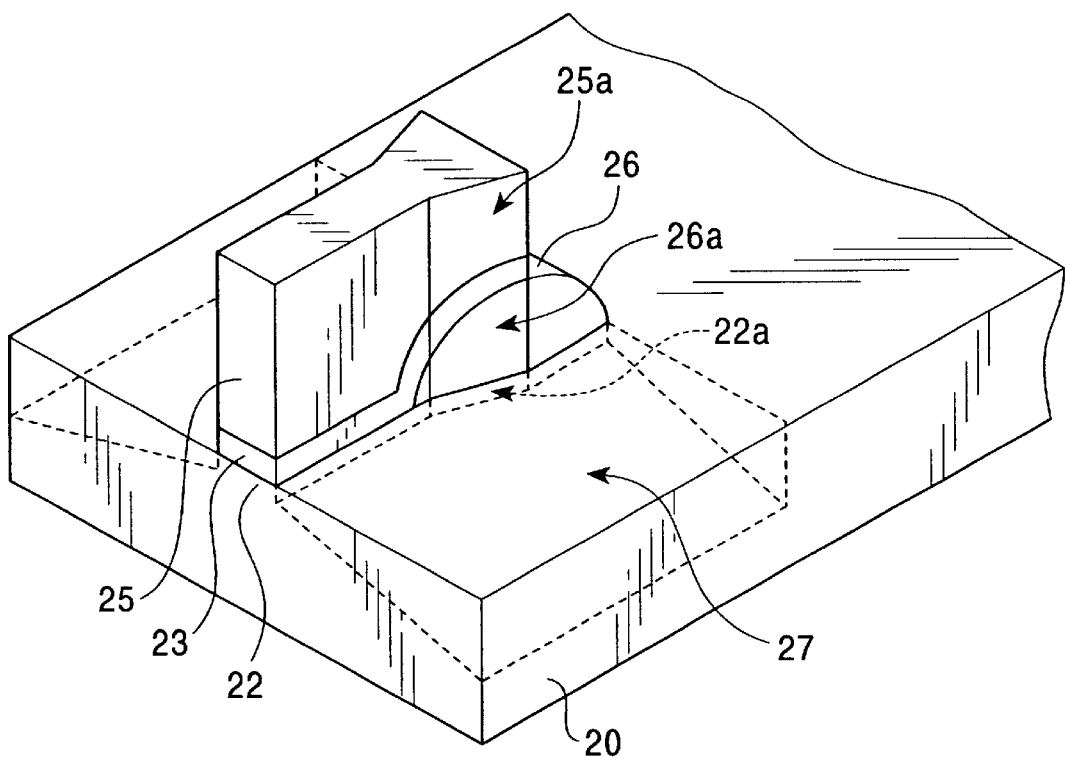
FIG. 27 is a diagram illustrating another step of the method for manufacturing the thin-film magnetic head of the present invention.
Figure 28:
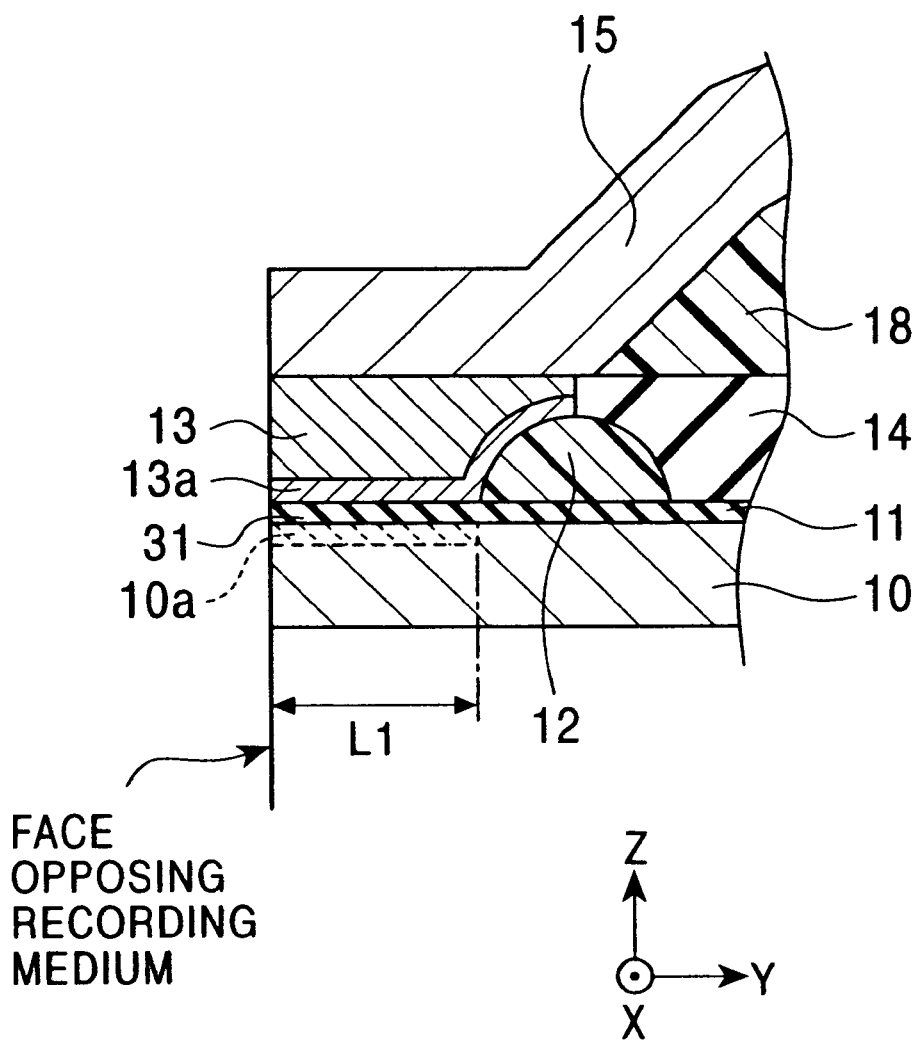
FIG. 28 is a partial vertical cross-sectional view of the vicinity of the opposing face in a conventional thin-film magnetic head.

After removing the portions of the Gd defining layer 26 protruding from the two side faces 25a of the upper magnetic pole layer 25 by a chemical etching process such as RIE or ashing as described above, ion milling is performed to physically mill the exposed surfaces of the lower core layer 20 extending in the track width direction from the two side faces 25a of the upper magnetic pole layer 25 (the portion indicated by dotted lines in FIG. 27). Through this step, the lower magnetic core layer 22 protruding from the lower core layer 20 toward the upper magnetic pole layer 25 can be formed under the Gd defining layer 26 and the gap layer 23.

Through the step shown in FIG. 27, the Gd defining layer 26 and the lower magnetic core layer 22 do not protrude in the track width direction from the two side faces 25a of the upper magnetic pole layer 25. The two side faces 22a of the lower magnetic core layer 22 and the two side faces 26a of the Gd defining layer 26 can be made flush with the two side faces 25a of the upper magnetic pole layer 25.

As described above, the method of the present invention for manufacturing a thin-film magnetic head comprising the Gd defining layer 26 and the lower magnetic core layer 22 formed by milling the surfaces of the lower core layer 20 includes the steps of removing the portions of the Gd defining layer 26 protruding in the track width direction from the two sides of the upper magnetic pole layer 25 by a chemical etching process such as RIE or ashing so as to make the two side faces 26a of the Gd defining layer 26 flush with the two side faces 25a of the upper magnetic pole layer 25, and of physically milling the surfaces of the lower core layer 20 extending from the two sides of the upper magnetic pole layer 25 by ion milling so as to make the lower magnetic core layer 22 protruding from the surfaces of the lower core layer 20.

According to the above method, the two side faces 22a of the lower magnetic core layer 22 can be made flush with the two side faces 25a of the upper magnetic pole layer 25. Unlike in the conventional process, the lower magnetic core layer 22 does not protrude from the two side faces 25a of the upper magnetic pole layer 25 in the track width direction. Thus, a thin-film magnetic head which can suitably prevent wide writing while having a small gap depth can be easily manufactured with high reproducibility.

The feature of the present invention is that the portions of the Gd defining layer 26 and the lower magnetic core layer 22 protruding from the two sides of the upper magnetic pole layer 25 are removed. The aim of the present invention is to make the side faces 26a and 22a of the Gd defining layer 26 and the lower magnetic core layer 22, respectively, as flush as feasibly possible with the side faces 25a of the upper magnetic pole layer 25. However, the Gd defining layer 26 and the lower magnetic core layer 22 may slightly bulge in the track width direction while being continuous with the two side faces 25a of the upper magnetic pole layer 25. For the purpose of the specification, such a state is also considered as being "flush" with the side faces 25a.

The perspective views such as FIG. 1 are only schematic; hence, the shape of the magnetic pole unit 21 protruding from the surfaces of the lower core layer 20 may not be rectangular. For example, the magnetic pole unit 21 may have a gradually increasing width as it extends from the lower magnetic core layer 22 toward the upper magnetic pole layer 25 and, thus, may have a substantially inverted-trapezoidal cross-section taken parallel to the face opposing the recording medium. Alternatively, the magnetic pole unit 21 may include: a lower magnetic core layer 22 having a substantially trapezoidal cross-section taken parallel to the opposing face; and a composite of layers from a gap layer 23 to a upper magnetic pole layer 25, the composite having a substantially inverted-trapezoidal cross-section taken parallel to the opposing face.

What is claimed is:

1. A thin-film magnetic head comprising:
    a lower core layer comprising a lower magnetic pole section which extends in a height direction from an opposing face of the thin-film magnetic head opposing a recording medium and protrudes from an upper surface of the lower core layer;
    a gap layer formed on the lower core layer;
    an upper magnetic pole layer formed on the gap layer, the upper magnetic pole layer having a width smaller than that of the lower core layer;
    an upper core layer formed on the upper magnetic pole layer and above the gap layer; and
    a gap depth defining layer formed above the lower magnetic core layer and under the upper magnetic pole layer below the upper core layer, the gap depth defining layer being disposed a predetermined distance behind said opposing face,
    wherein two side faces of the gap depth defining layer and two side faces of the lower magnetic pole section in a track width direction are flush with at least one of two side faces of the upper magnetic pole layer and the two side faces of the upper core layer in the track width direction at at least a front portion of the layers that is close to said opposing face,
    a coil layer formed on the lower core layer with an insulating layer therebetween, the coil layer being formed behind the lower magnetic core layer in the height direction,
    wherein the coil layer is covered with the gap depth defining layer, and a front portion of the gap depth defining layer lying in front of the coil layer has two side faces that are flush with the two side faces of the upper magnetic pole layer.

2. The thin-film magnetic head according to claim 1, wherein a length of the lower magnetic pole section at said front portion is at least 0.6 µm.

3. The thin-film magnetic head according to claim 1, wherein the gap layer is formed on the lower magnetic pole section, and the gap depth defining layer is formed on the gap layer.

4. The thin-film magnetic head according to claim 3, wherein the gap layer comprises an insulative material comprising at least one selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

5. The thin-film magnetic head according to claim 1, wherein the gap depth defining layer is formed on the lower magnetic pole section, and the gap layer extends over the lower magnetic pole section and the gap depth defining layer.

6. The thin-film magnetic head according to claim 5, wherein the gap layer comprises a nonmagnetic metal material comprising at least one selected from the group consisting of NiP, NiPd, NiW, NiMo, NiCu, Au, Pt, Rh, Pd, Ru, and Cr.

7. The thin-film magnetic head according to claim 1, wherein the gap depth defining layer has a substantially semi-elliptic vertical cross-section taken in the height direction and in a direction perpendicular to a bottom face of the lower core layer.

8. The thin-film magnetic head according to claim 1, wherein the gap depth defining layer protrudes in the height direction from a back end face of the upper magnetic pole layer, and the protruding portion of the gap depth defining layer has one of a flat and curved face tilting in the height direction as the face extends from the upper magnetic pole layer to the lower magnetic pole section.

* * * * *